United States Patent
Mizutani et al.

(10) Patent No.: US 8,654,766 B2
(45) Date of Patent: Feb. 18, 2014

(54) SYSTEM APPARATUS AND METHOD FOR INTERCONNECTING TDM AND FRAME/PACKET COMMUNICATION NETWORKS

(75) Inventors: Masahiko Mizutani, Kokubunji (JP); Yoshihiro Ashi, Yokohama (JP); Masayuki Takase, Kokubunji (JP); Atsushi Iwamura, Yokohama (JP); Akihiko Tanaka, Yokohama (JP); Hideki Endo, Hachioji (JP); Tohru Kazawa, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/465,356

(22) Filed: May 7, 2012

(65) Prior Publication Data

US 2012/0219006 A1    Aug. 30, 2012

Related U.S. Application Data

(63) Continuation of application No. 11/339,449, filed on Jan. 26, 2006, now Pat. No. 8,189,571.

(30) Foreign Application Priority Data

Sep. 6, 2005    (JP) ................................. 2005-257244

(51) Int. Cl.
*H04L 12/56*    (2011.01)
*H04J 3/04*    (2006.01)

(52) U.S. Cl.
USPC ............................ 370/389; 370/401; 370/536

(58) Field of Classification Search
None
See application file for complete search history.

(56) References Cited

U.S. PATENT DOCUMENTS

| | | | |
|---|---|---|---|
| 6,414,939 B1 | 7/2002 | Yamato | |
| 6,480,511 B1 | 11/2002 | Petty | |
| 7,076,559 B1 | 7/2006 | Ghanwani et al. | |
| 7,283,477 B1 | 10/2007 | Fedyk et al. | |
| 7,672,314 B2 | 3/2010 | Elangovan | |
| 7,970,929 B1 * | 6/2011 | Mahalingaiah | 370/338 |
| 2001/0005382 A1 | 6/2001 | Cave et al. | |
| 2002/0093949 A1 | 7/2002 | Yasue et al. | |
| 2002/0141444 A1 | 10/2002 | Kano et al. | |

(Continued)

FOREIGN PATENT DOCUMENTS

| | | |
|---|---|---|
| CN | 1367969 | 9/1999 |
| JP | 2005-244470 | 9/2005 |
| JP | 2006-25044 A | 1/2006 |
| WO | WO 2004/084506 A1 | 9/2004 |

OTHER PUBLICATIONS

Japanese Office Action dated Oct. 16, 2012 (two (2) pages).

(Continued)

*Primary Examiner* — Gregory Sefcheck
*Assistant Examiner* — Joshua Smith
(74) *Attorney, Agent, or Firm* — Crowell & Moring LLP

(57) ABSTRACT

An interconnection between fully synchronous networks and next-generation frame communications networks is disclosed. A means of bidirectional frame format conversion between a synchronous multiplexing system and a logical multiplexing system is provided, along with a method of transmitting data between different networks on a path as if it were being transmitted in the same network. Further, when converting network control information in an STM network into data suitable for a packet network, even across the boundary of a synchronous multiplexing system and a logical multiplexing system, a unified communication management means is provided over the whole path.

3 Claims, 18 Drawing Sheets

(56) References Cited

U.S. PATENT DOCUMENTS

| | | |
|---|---|---|
| 2003/0108069 A1 | 6/2003 | Yamada |
| 2004/0196827 A1 | 10/2004 | Xu et al. |
| 2004/0264503 A1* | 12/2004 | Draves, Jr. .................... 370/469 |
| 2005/0013280 A1* | 1/2005 | Buddhikot et al. ........... 370/349 |
| 2005/0041675 A1* | 2/2005 | Trostle et al. ................. 370/401 |
| 2005/0063397 A1* | 3/2005 | Wu et al. ....................... 370/401 |
| 2005/0105558 A1 | 5/2005 | Doidge et al. |
| 2005/0169270 A1 | 8/2005 | Mutou et al. |
| 2006/0002366 A1* | 1/2006 | Kawaguchi et al. .......... 370/349 |
| 2006/0007939 A1* | 1/2006 | Elangovan ............... 370/395.53 |
| 2006/0256818 A1* | 11/2006 | Shvodian et al. ............. 370/474 |
| 2006/0262774 A1 | 11/2006 | Moldestad et al. |
| 2007/0041379 A1 | 2/2007 | Previdi et al. |

OTHER PUBLICATIONS

Office Action from the Chinese Patent Office, dated Apr. 10, 2009.

* cited by examiner

FIG.14

| AU POINTER | INPUT PATH ID | TU POINTER | CHANNEL ID | DESTINATION IWE | |
|---|---|---|---|---|---|
| a | Ipath 1 | A | ch#1 | IWE A | |
| b | Ipath 2 | B | ch#2 | IWE B | |
| | | | | | |
| | | | | | |

| CHANNEL NUMBER | DESTINATION IWE | FLOW ID (TU-FR) | LOWER LEVEL ID TOWARD THE NEXT HOP (AU-FR) | ..... |
|---|---|---|---|---|
| Ch 1 | ADDRESS #1 | VC 1 | VP 1 | |
| Ch 2 | ADDRESS #2 | VC 2 | VP 1 | |
| ...... | | | | |
| Ch N | ADDRESS #N | VC N | VP 2 | |

Figure 19:
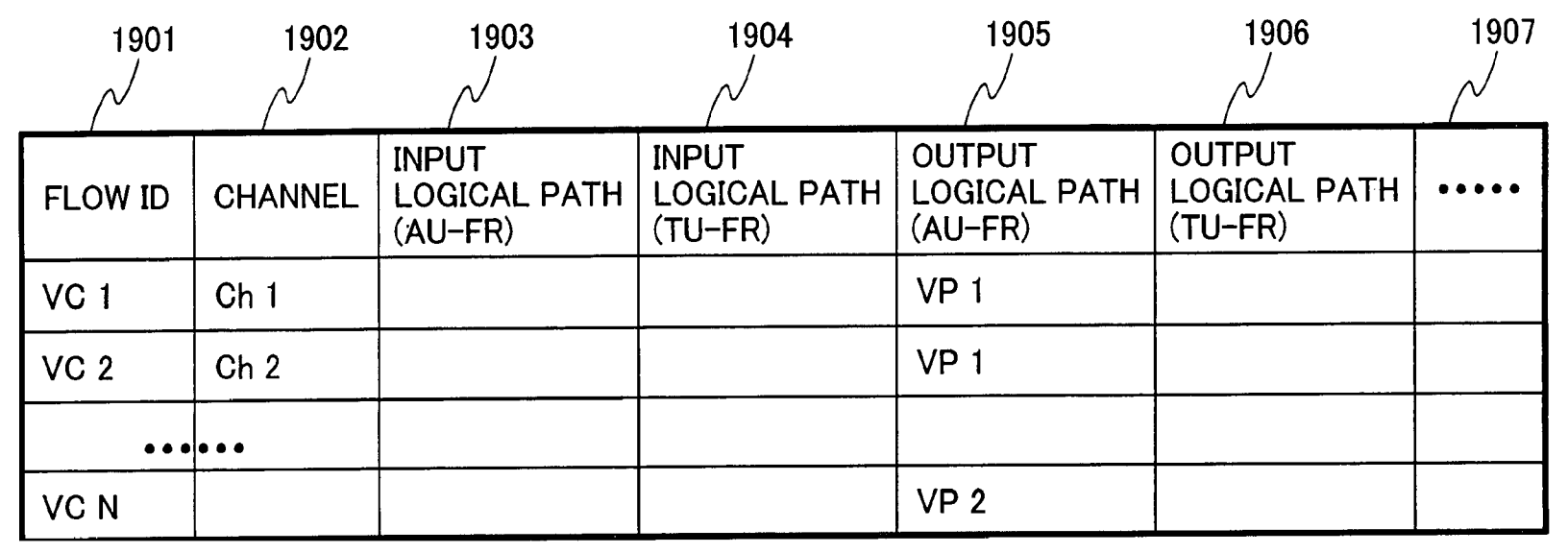

| FLOW ID | CHANNEL | INPUT LOGICAL PATH (AU-FR) | INPUT LOGICAL PATH (TU-FR) | OUTPUT LOGICAL PATH (AU-FR) | OUTPUT LOGICAL PATH (TU-FR) | ..... |
|---|---|---|---|---|---|---|
| VC 1 | Ch 1 | | | VP 1 | | |
| VC 2 | Ch 2 | | | VP 1 | | |
| ... | | | | | | |
| VC N | | | | VP 2 | | |

1901 1902 1903 1904 1905 1906 1907

SYSTEM APPARATUS AND METHOD FOR INTERCONNECTING TDM AND FRAME/PACKET COMMUNICATION NETWORKS

CLAIM OF PRIORITY

This application is a continuation of U.S. patent application Ser. No. 11/339,449, filed Jan. 26, 2006, which in turn claims the priority of Japanese application JP 2005-257244 filed on Sep. 6, 2005. The entire disclosure of each of the above-identified applications is incorporated herein by reference.

FIELD OF THE INVENTION

This invention relates to an interworking method and device which relay communication between networks with different communication methods. In particular, it relates to a method and device which interconnect a synchronous network which performs synchronous multiplexing frame communication, with an asynchronous network which performs variable-length frame or packet communication. This invention further relates to a logical path management method which hierarchically uses an identifier in order to enhance compatibility with a synchronous multiplexing frame in the asynchronous network which performs connection-less communication. This invention still further relates to a communication apparatus which performs data packet or data frame relay based on the aforesaid logical path management method.

BACKGROUND OF THE INVENTION

Digital transmission systems have become familiar in daily life with progress in fiber optic cable or LSI manufacturing techniques and digital signal processing techniques. Optical communication methods permit large scale, long distance relays with little communication loss, and far less long distance communication cost. Moreover, the bandwidth required for digital data transmission has been suppressed due to progress of coding techniques. Hence, ISDN (Integrated Services Digital Network) services which can handle multimedia, such as telephone, data and images in a unified way, were started, and SDH (Synchronous Digital Hierarchy) which is a mass communication-oriented multiplexing method, was standardized in a form which supports generalization of ISDN. SDH is a globally universal, fully synchronous interface which can be expanded from high capacity communications to the telephone network, which permits flexible multiplexing of various communications service data which has ample operating and maintenance features, and is highly reliable. SDH with these characteristics are now being constructed all over the world, and are employed as the main technique in physical layers in many networks even today with the spread of the Internet.

The Internet, which has become a worldwide phenomenon in recent years, is an information network which is based on IP (Internet Protocol). IP can use address dynamic setting functions, such as routing protocols, e.g., OSPF and DHCP, and requires little effort for network construction. Therefore, IP is rapidly becoming universal and is already used as a global information network. IP networks provided by carriers and ISP are indispensable to life today. In recent years, as regards data link layers, the use of LAN (Local Area Networks) in companies or households has also been progressing, and information and telecommunications networks which use Ethernet (registered trademark) are being constructed due to their ease of handling. Examples are wide area Ethernet services and metro Ethernet services. As can be seen from this situation, if everyone can use and build a network, it will require less time to make network connections, and there will be an increasing shift to a connection-less communication method which permits dynamic operation.

Reflecting such technological trends, the interfaces in routers or switches also generally use Ethernet. Ethernet is not strictly equipped with employment maintenance functions like SDH, and it is difficult to guarantee quality because of connection-less communication. However, since it has becoming more popular, standardization bodies are considering the implementation of data utility architecture by Ethernet and implementation of OAM in Ethernet. To deal with increasing amounts of information, studies are now in progress on Ethernet with throughputs of 10 Gbps and 40 Gbps, and a gradual shift to asynchronous networks is taking place.

However, since SDH has been widely used in carrier networks or company networks, under the present circumstances, since network shifts take time, and since it is still not as reliable as fully synchronous networks in Ethernet or IP base communication technology, it is expected that synchronous networks and asynchronous networks will continue to co-exist for some time. Although Ethernet frames are being forwarded on SDH frames, mutual communication functions with an Ethernet physical layer and a synchronous network including SDH, have hardly been provided until now. Hence, interconnection techniques which make use of conventional resources will be indispensable to the transition period to asynchronous networks.

Due to the expansion of connection-less communication, the service types which can be used on a network are increasing, and more and more services are demanding network quality, not only for perusing Web data but also for voice telephone, video-on-demand and access to confidential data, etc. Although they are conflicting requirements, user convenience, and the maintenance of communication quality and security, will be important matters to consider in future network construction.

SUMMARY OF THE INVENTION

Network construction technology is shifting to next generation networks (NGN) centered on packet networks. However, considering that synchronous networks using PDH and SDH have been widely used as standard technology both in Japan and other countries, it is difficult to imagine that the shift to next generation networks will happen immediately. In MAC/IP networks and MPLS networks which are regarded as next generation networks, there are still insufficient functions to accommodate existing networks in addition to network control and quality control, and this is also an important point as regards the shift of network construction technology. This is because STM networks have been introduced into carrier networks and trunk-line data service networks such as company backbones due to their reliability, so demand for quality will be very high.

In order to resolve this, it is necessary to realize, in next generation networks, the same level of maintenance and operability that has been obtained conventionally in synchronous networks, or higher. Further, to ensure interconnection with synchronous networks, it is required to perform mutual notification of management information without impairing the maintenance and operability of an STM network. Perfect mutual communication can be provided by implementing, on an asynchronous packet network, the concept of hierarchized management of communication quality adopted for STM. For this purpose, it is expected that specific architecture for performing mutual notification of control data will be needed. In this way, it will be possible to provide the communication quality of a STM network even in a packet network, and to provide a network having high reliability and flexibility of network construction as a next generation communications network.

The first problem that this invention resolves, assuming adoption of the next-generation packet communication networks in carrier or company networks, is to provide the STM network services, which have conventionally developed based on the telephone network, in packet networks. The services meant here are telephone, images and data distribution. For that purpose, also in asynchronous networks, a communication quality control function equivalent to that of an STM network is required.

The second problem that this invention resolves, is to realize interconnection of synchronous networks and asynchronous networks required for the transition period from the former synchronous networks to the next generation frame communications networks. The point here is that a bidirectional frame format conversion means is provided for a synchronous multiplexing system and a logical multiplexing system, so that data can be transmitted between different networks on the path as if it were being transmitted in the same network. Also, network control information in the STM network is simultaneously converted into data suitable for packet networks, and a unified communication management means is provided over the whole paths which transcends even the boundary between the synchronous multiplexing system and logical multiplexing system.

For this purpose, this invention provides a hierarchized logical path control method for a network formed by two or more information relay devices having one or more line interfaces, wherein:

the network comprises a means to perform communication between the information relay devices using data packets, and when performing communication between any two points in the network, to control the path via which the packets pass between the points, wherein:

the communication path control means has a first communication path controlling function which is terminated at the end point of the aforesaid communication section, and performs communication management at a connection (session) level, and a second communication path controlling function which is terminated at each communication section between arbitrary adjoining information relay devices contained in the aforesaid communication section, and performs communication management for every section of a physical circuit or logical circuit.

In a connection-less packet communication network, by introducing a hierarchized logical path management function, communication quality can be improved while network construction is still easily performed, the latter being a characteristic feature of packet communication networks. Although a path setup and communication management function were not provided in the prior art, this invention can implement a maintenance management function in packet communication networks, improve the convenience of network management and expand the service region supported by the packet network. Specifically, services provided using voice communication and dedicated lines for packet communication networks conventionally used as data networks such as wide area Ethernet (wide area LAN), can also be accommodated, which alleviates the burden on a company which manages several networks with different communication methods.

Introducing the concept of hierarchized path management provides compatibility with the communication control functions of synchronous networks which have been used hitherto. This expands the range of choice of physical layer infrastructure. It promotes use of the existing infrastructure, and provides flexible correspondence in the transition period to next generation networks which will be based on packet communications.

In particular, in the management of carrier or company networks, it will be possible to ensure reliability even after shifting to packet communication networks by performing network quality management equivalent to that of the synchronous networks used hitherto. Further, since the control data for hierarchized management can be converted for both synchronous networks and packet networks, there is no change in the operating system and a shift to next generation networks is therefore possible.

BRIEF DESCRIPTION OF THE DRAWINGS

FIG. 14 shows a configuration example of an input management table maintained in an interworking device of FIG. 13.

FIG. 15 shows a configuration example of an IW management table maintained in the interworking device of FIG. 13.

FIG. 19 shows the configuration of an XC management table maintained in XC.

DETAILED DESCRIPTION OF THE PREFERRED EMBODIMENTS

This invention realizes interconnection of a synchronous control method which identifies a data transmitting channel and improves the data transmitting efficiency on a circuit by synchronous multiplexing, and a frame (packet) multiplexing mode which sends and receives data in the form of frames or packets. Although the synchronous network is assumed to be a STM network, and the asynchronous network is assumed to be an Ethernet network, the application protocol or network composition of this invention is not limited thereto.

Figure 1:
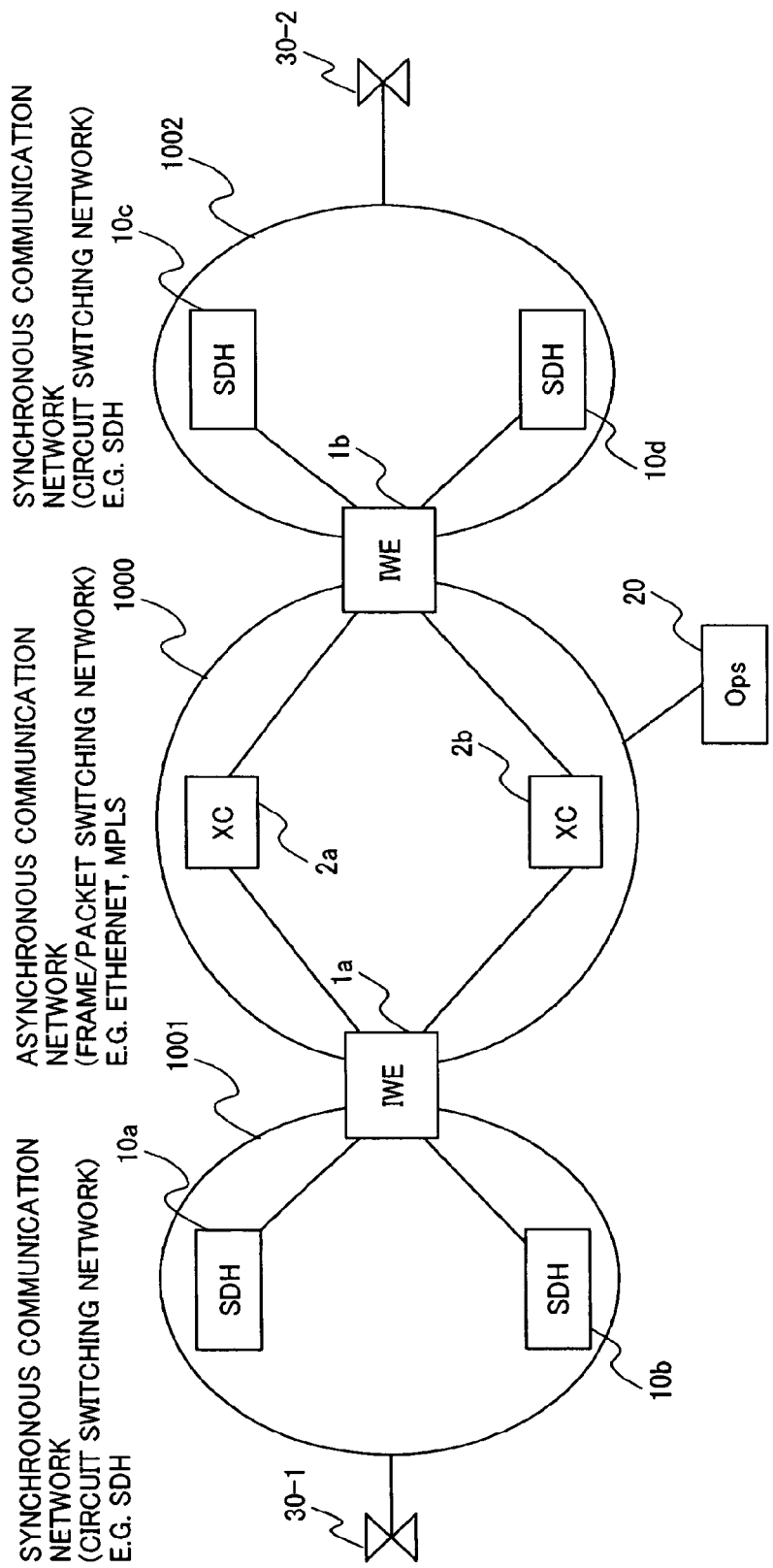
FIG. 1 is a network diagram showing a basic embodiment of this invention.

FIG. 1 is a diagram describing the basic construction of the network to which this invention is applied. Synchronous communication networks, represented by STM (Synchronous Transfer Module) networks which have been widely used in the prior art (hereafter, synchronous network) 1001, 1002, have terminal units 30-1, 30-2 in an asynchronous communication network (hereafter, asynchronous network) 1000 such as Ethernet, and in the communication between the terminals 30-1, 30-2, data between the mutually discrete synchronous networks is relayed by the asynchronous network.

In the asynchronous network 1000 used as a relay network, the connecting points with the synchronous networks 1001, 1002 is provided by IWE (Interworking Equipment) 1a, 1b for mutual interconnection between the synchronous networks and asynchronous network. Now, assume a message is sent from the terminal unit 30-1 to the terminal unit 30-2. Thereby, generality is not lost. The data transmitted from the terminal unit 30-1 is sent by an IWE 1a via a vacant channel (at the communication start time of the terminal 30-1) in the synchronous network 1000. The IWE1a converts the frames received from the synchronous network 1001 side into a format for sending to the asynchronous network 1000. The data specifically carried by the channel in the synchronous network 1001 is sampled at a specific time interval, and converted to information fragments having a specific size. Here, to identify the transmitting path of the information fragments (hereafter, frames), an information fragment (contents and attribute) in the frame is identified, and a header for collecting the data, which is sent over the path in frame units in a user terminal device or the opposite IWE, is assigned.

In a synchronous network, whether communication is permitted or not is determined by whether or not the communication channel set up beforehand between the destinations which require communication, is vacant. Therefore, a fixed address and communication path are assigned to the flow by the channel to which it belongs. The path to the destination is not specified in packet communication networks, and the bandwidth to the destination also is not guaranteed. In order to manage communication quality in an asynchronous network, after specifying the path to the destination, it is required to grasp the communication state for each section between relay devices. Therefore, communication management data based on a synchronous network channel are converted by the IWE1a into a logical multiplexing system using packets in the asynchronous network. Data specifying the communication path to the destination, and data specifying the physical circuit to an adjacent communication apparatus or the logical circuit multiplexed therewith, are included in the packet header.

An IWE2a, which is the opposite device to the IWE1a, classifies and collects the frames received through the asynchronous network 1000 based on the analysis effect of the header information assigned by the IWE1a and XC, and reconstructs synchronous communication frames. A vacant channel addressed to the terminal unit 30-2 is assigned to these frames from the communication channel provided in the synchronous network 1002, and the frames are transmitted to the synchronous network 1002.

The processing procedure in the above mutual communication is the same also for communication from the terminal unit 30-2 to 30-1, and enables bidirectional communication.

In the communication in the asynchronous network 1000, for paths from IWE1a to IWE1b, all the paths are managed. This largely differs from hop by hop path control seen in a conventional frame communications network. Hence, all communications are not connection-less but are connection-oriented, so communication quality and fault status can be managed. In order to realize this, a high level path layer ID which identifies the transmission destination for each data unit (data flow) between IWE1a and IWE2a, and a low level path layer ID which performs state management of the path through which data actually passes between IWE1a and XC2a, and XC2a and IWE1b, are used. By introducing these hierarchized path management parameters, compatibility with the path management in the synchronous network hitherto managed by the hierarchized model can be maintained. For example, the high level path ID is associated with VC-11 which is a cross-connection unit in the synchronous network, the low level path ID is associated with a STM-N frame of a multiplexing session unit, and the path configuration of the synchronous network can be inherited by the asynchronous network by exchanging path IDs mutually via the IWE1a. It can be noted that the low level path management ID set in the asynchronous network does not need to have a physical circuit itself, and may be logically assigned like for example a VLAN (Virtual LAN).

Figure 2:
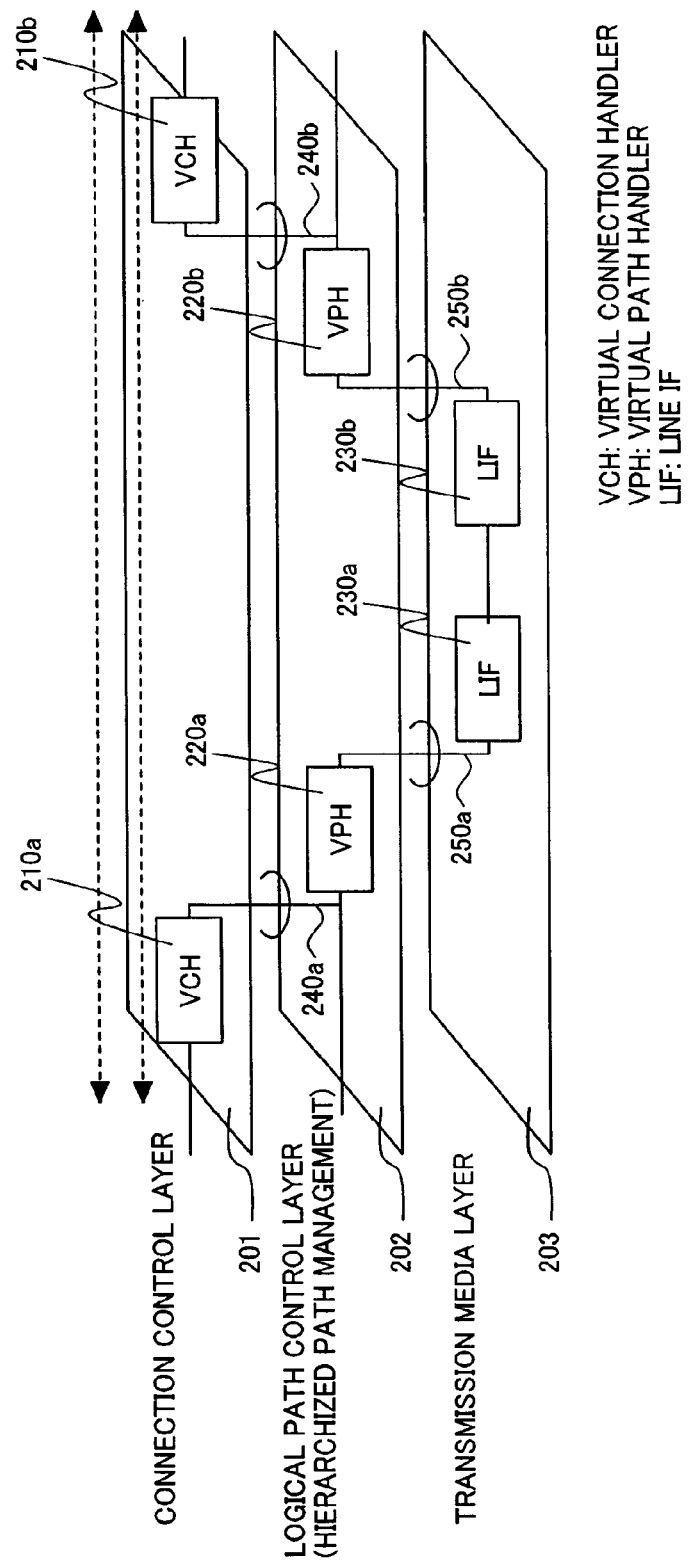
FIG. 2 is a diagram of functional correlation between path layers describing the path hierarchy in an asynchronous communication network (asynchronous network).

FIG. 2 shows the path management model in the asynchronous network when this invention is applied. The path hierarchy in the asynchronous network 1000 contains a connection control layer (VC layer) 201, logical path control layer (VP layer) 202 and transmission media layer (PHY layer) 203.

The VC layer 201 is the uppermost connection (session) identification layer in the communication relay section using the asynchronous network. This connection control is used as a flow identifier between relay devices (IWE or a connection management device equivalent to IWE in the asynchronous network, or a service processing unit such as a user terminal) which are independent of the processing of the low level layer. When performing a connection management only by IWE at both ends of the asynchronous network, a consistent connection (session) throughout the asynchronous network is managed by a connection identifier. In this case, it is possible to use it as an identifier of the destination IWE in the asynchronous network 1000.

The VP layer 202 has the role of determining the path through which frames pass in order to reach the destination specified by the VC layer in the asynchronous network 1000. Although independent control is performed, the control parameters of both layers are associated with the VC layer by the logical connections 240a, 240b. Also as compared with a conventional STM network and ATM network, a logical path can be arbitrarily set on condition that the final address can be reached, even for a circuit which is a different physical circuit (i.e., next hop), without the VP layer in the asynchronous network being limited only to the physical circuits set up between specific devices. Therefore, the logical connections 240a, 240b with the VC layer and VP layer may multiplex VC with any VP. The logical path is terminated at the cross-connection device (XC) of FIG. 1, and it is connected to a logical path which goes to XC of the following layer based on the logical path routing table maintained by XC.

The PHY layer 203 manages the physical circuits which connect the frame relay devices IWE, XC. Control which is independent of the VC layer and VP layer is performed. Assuming management from the OpS, although the logical connections 250a, 250b with the VC layer will be set up according to instructions from the OpS, the connections 250a, 250b can be set up dynamically referring to the resource usage status of the physical circuits.

Figure 3:
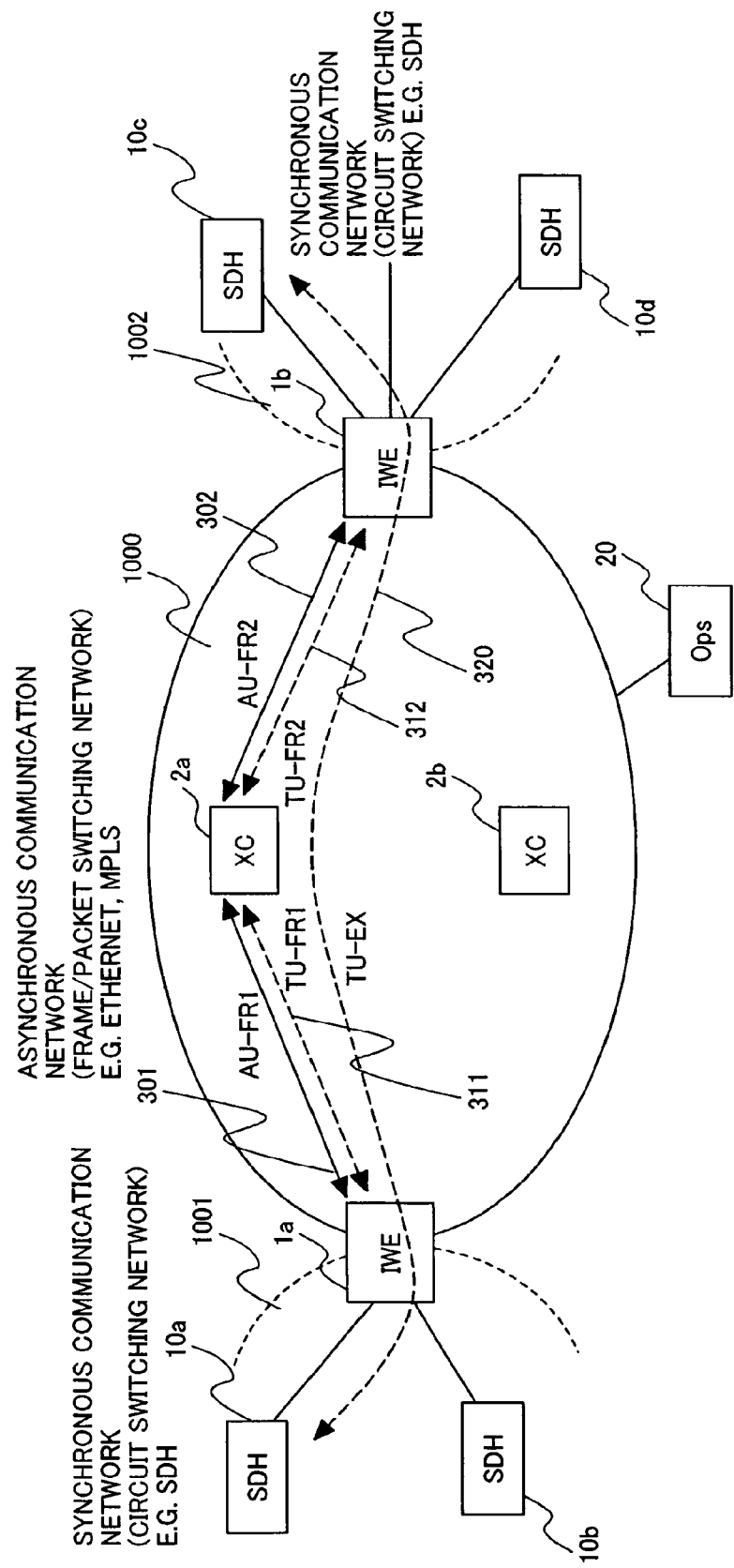
FIG. 3 is a diagram describing a path setting method when applying the hierarchized path control of FIG. 2 to the basic network configuration of FIG. 1 (Embodiment 1).

FIG. 3 is a diagram describing the path setting method when the hierarchized path control of FIG. 2 is applied to the basic network configuration of FIG. 1. Here, the case where the path passes through XC2a to allow the synchronous networks 1001, 1002 to communicate via the asynchronous network 1000, will be considered. In the asynchronous network 1000, communication is performed using a path ID logically set up for the physical circuit which connects the relay devices IWE, XC. This path identification specifies the path between adjacent devices, and can provide an arbitrary number of logical paths to one physical circuit. This ID is set to the low level path ID.

The relay devices IWE, XC, when a frame is received, forward it to other relay devices in the asynchronous network by referring to the correspondence relation of the input logical path ID of the received frame and the transmission destination logical path ID. This correspondence relation is statically set up by the OpS before transmission, or is dynamically set up by an existing protocol like LDP (Label Distribution Protocol). In FIG. 3, this corresponds to paths AU-FR1 (301), AU-FR2 (302). By this path identification, the forwarding path in alignment with the physical circuit between devices is identified. This path identification identifies the circuits between devices in the synchronous network (STM network), and is equivalent to an AU pointer which transmits synchronous data. In IWE, when relaying data from the synchronous network to the asynchronous network, circuit identification data is extracted from AU pointers, and is used to identify the circuit used for transmitting to the asynchronous network (i.e., frame header generation processing).

TU-FR1 (311), TU-FR2 (312) are flow identifiers between IWE1a, XC2a and XC2a, and IWE1b, respectively. These flow IDs are for extracting each flow from plural flows multiplexed by the low level logical paths AU-FR1 (301), AU-FR2 (302), and are managed in a format belonging to the low level logical path ID. Therefore, the flow in the asynchronous network can be consistently identified by a combination of AU-FR and TU-FR, and when many flows are multiplexed for each logical path, scalability from the management viewpoint can be ensured. TU-FR1 (311) and TU-FR2 (312) (hereafter, in generally discussing the concept of TU-FR, referred to as TU-FR) contain phase information for identifying the flow between relay devices in the synchronous networks. In the synchronous networks, the communication channel is identified by a combination of an AU pointer and a TU pointer, and in practice, the channel is an ID for identifying the flow. In the asynchronous network XC, the flow is identified by the low level logical path AU-FR and TU-FR which accompanies AU-FR, and consistent flow management throughout the network is implemented by exchanging flow IDs between input and output logical paths via XC. In IWE, after identifying the channel from the AU and TU pointers of the synchronous networks and identifying the destination IWE from each channel, the corresponding output logical path for the relevant IWE and the flow identifier TU-FR on the logical path are assigned to the frame and sent out.

By associating TU-FR1 (311) and TU-FR2 (312) with XC, and associating the combination of the AU pointer and TU pointer in the synchronous networks with a set of AU-FR and TU-FR in the asynchronous network, end-to-end flow management and path management as between the terminal devices 30-1, 30-2 of FIG. 1, and communication state management for each forwarding section, are implemented.

Figure 4:
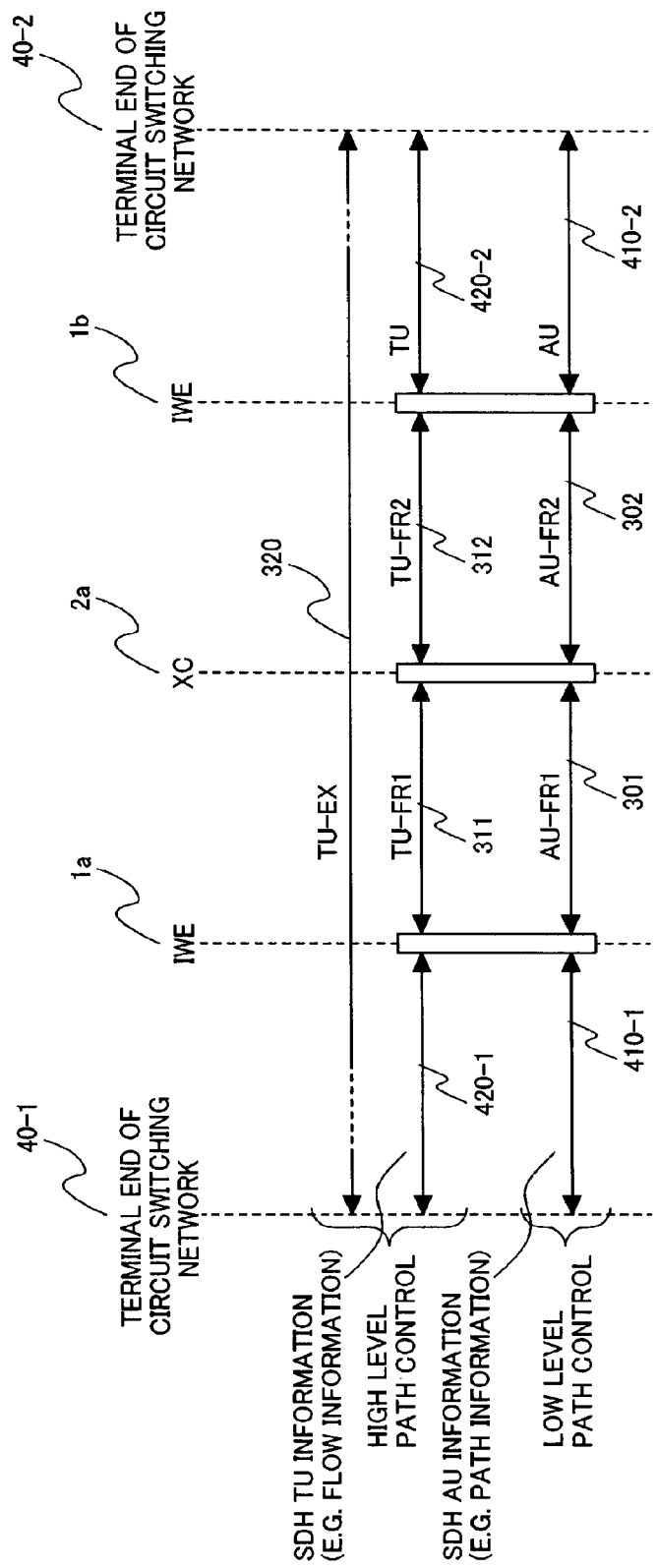
FIG. 4 is a diagram describing a logical path management method in an asynchronous network when the path management method of FIG. 3 is applied.

FIG. 4 shows the logical path management method in the asynchronous network to which the path management method of FIG. 3 is applied. The drawing describes the correlation of parameters in the unit equivalent to the logical path control layer among the hierarchized models of FIG. 2.

The logical path used for asynchronous network communication is formed by the high level paths TU-FR1 (440-1), TU-FR2 (440-2), and low level paths AU-FR1 (430-1), AU-FR2 (430-2). The high level path TU-FR is a flow identifier on the circuit between devices, and termination is performed at the termination point of the low level logical path. Likewise, the low level ID is terminated at the termination point of the logical circuit, i.e., in physical circuit units between devices. Here, a classification can be made for every path management layer in each forwarding section, but when performing path management according to this embodiment, the high level path and low level path ID are closely inter-related (description of FIG. 3).

When determining the path IDs in adjacent forwarding sections by the logical path cross-connection of IWE and XC, to have the correspondence relation between the channels (flow ID), destinations and paths in the synchronous networks reflected in the asynchronous network, the following method is used. First, the data flow is identified to narrow down the forwarding channel (low level path ID). The flow ID is determined by combining a TU pointer, an AU pointer or TU-FR and AU-FR. Next, ID which can be used are selected from among candidate low level path IDs (paths with vacant bandwidth, paths which require priority control by service, etc.), and logical path IDs in adjacent sections are determined.

As described above, the communication path in the asynchronous network may be set beforehand, or may be set by dynamic control.

By maintaining the logical connection relation between the high level path ID for flow identification and the low level path ID in all the forwarding sections in the asynchronous communication network, management of an end-to-end connection (session) 400 is realized over both the synchronous networks and the asynchronous network.

Figure 5:
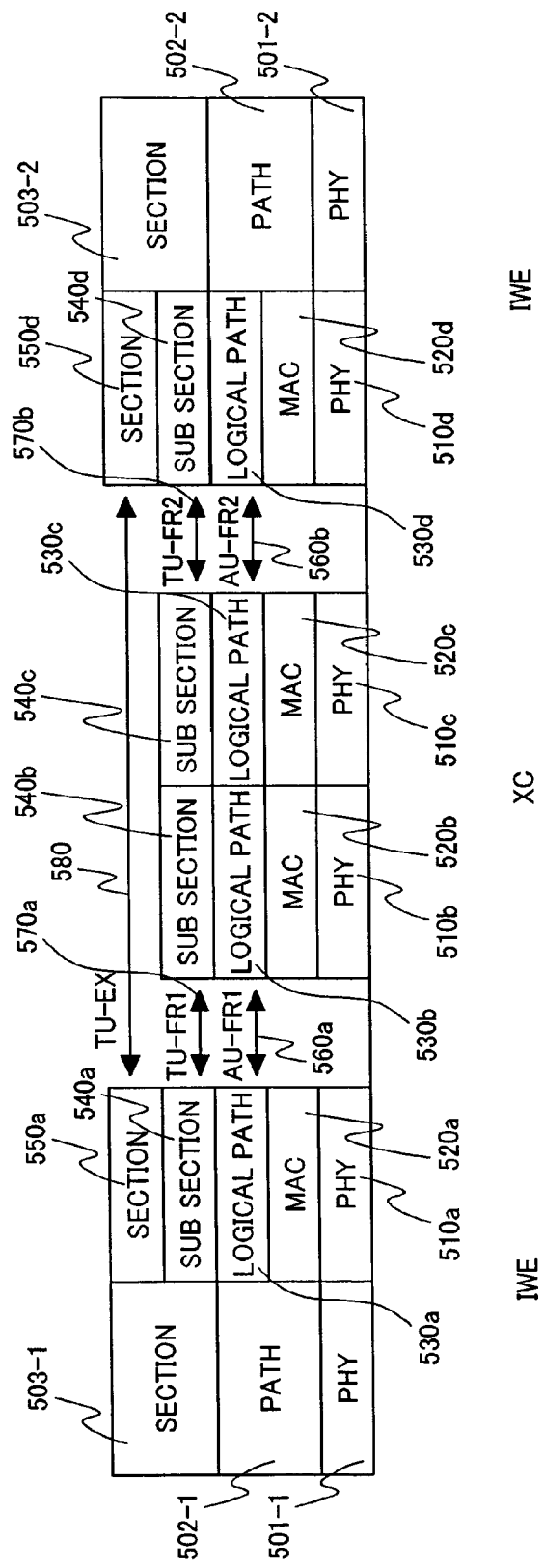
FIG. 5 is a protocol stack in the first embodiment of this invention.

FIG. 5 shows the protocol stack in the first embodiment of this invention. On the synchronous network side of IWE1a and IWE1b, hierarchized path control is performed by sections 503-1, 503-2 and paths 502-1, 502-2 managed by SOH (Section Overhead) and POH (Path Overhead) of an STM synchronous multiplexing frame. IWE has a physical circuit 501-1 on the synchronous network side, and a physical circuit 510a on the frame communications network side. For example, the former accommodates synchronous circuits, such as E1 and T1, and the latter accommodates packet communication lines, such as Ethernet. Within the packet communication network, a tag (label) for logically building a circuit is inserted in layers higher than the data link layer of an OSI reference model. For example, in a L2 network, these logical paths can be built using a VLAN (Virtual Local Area Network) tag, and in a MPLS (Multiprotocol Label Switching) network, they can be built using a label. Hence, in the packet communication network, this builds a logical path identification layer 530*a* on the upper level of the MAC identification layer 520*a*. The MAC layer 520*a* and the logical path layer 530*a* are equivalent to the logical circuit controlled by the SOH of a synchronous multiplexing frame.

Plural communications are multiplexed on the logical path 530*a*. Here, this multiplexed communication is called a connection (session), and is identified by a tag (label) as well as a logical path. In the IWE1*a*, this is the specification of a section session 540*a*. This session identification tag is used in a format which is stacked with the logical path identification tag. In the IWE1*a*, the section session 540*a* on the packet network side and the session 503-1 on the synchronous network side are interconnected, and consistent session management across both networks is realized. In this embodiment, a method was described where the session was terminated for every section. This means that each session can be managed as an entity belonging to a logical path. In the IWE1*a*, mutual notification of session information between networks is performed, but sessions managed by the synchronous network POH are identified as channels which are uniquely determined within the synchronous network, so it is desirable to interconnect session information which is managed in a unified way in the packet communication network, with the channel information in the synchronous network. Hence, In the IWE1*a*, a session layer 550*a* for unifying session management throughout the network at a high level of the section session layer 540*a* is provided, and communication control is performed by state mutual notification of this session layer 550*a* and the synchronous network side session layer 503-1.

In a logical path layer, the management flow is terminated for each section. Path management is performed between the logical path layers 530*a*, 530*b* by AU-FR1, and in the section from the logical path layers 530*c* to 530*d*, it is performed by AU-FR2. XC has the function of interconnecting these management flows.

Likewise, connections between the section session layers 540*a*, 540*b* are managed by TU-FR1, and connections between the section session layers 540*c*, 540*d* are managed by TU-FR2. XC likewise interconnects these management flows. XC also has a function to logically connect the section session layer 540 and the session layer 550 above it. When TU-FR is applied in the format belonging to AU-FR, in the connection between section sessions and interlayer connections between section session layers and session layers of XC, it is required to grasp the parameter correlation in the hierarchized logical path management architecture, and for this purpose, a management table holding logical relations (dependencies or equivalence relations) is maintained by XC.

Figure 6:
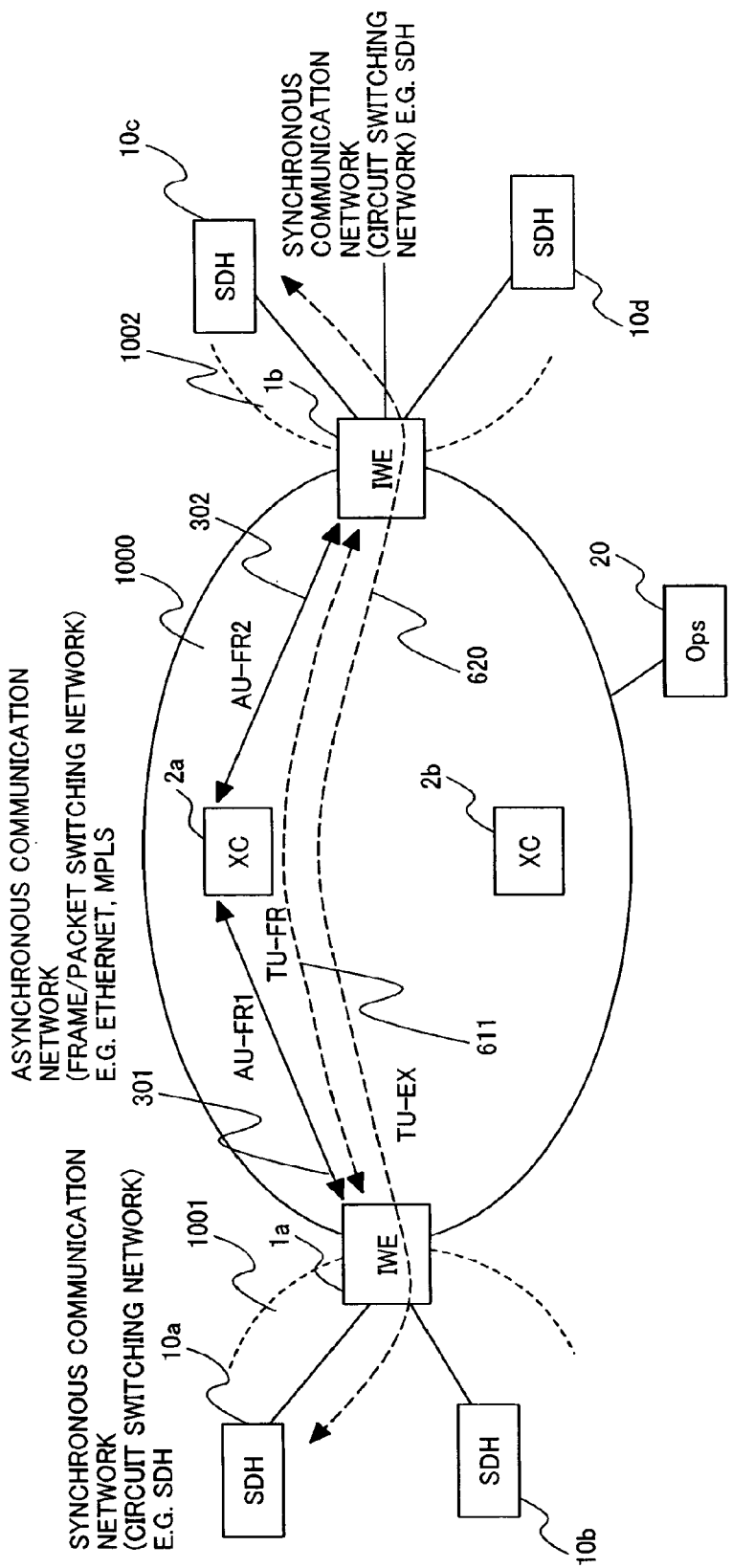
FIG. 6 is a diagram describing a path ID relay method (cross-connection processing) when a frame relay in an asynchronous network is performed (Embodiment 2).

FIG. 6 is a diagram describing a second embodiment of the hierarchized logical path control in the asynchronous network. The network configuration of the example is identical to that of the description of FIG. 3.

Here, a flow (session) ID which is consistent within the asynchronous network in the setup of the high level path ID is used. The low level path IDs AU-FR1 (311), AU-FR2 (312) are identical to those of the first embodiment (FIG. 3).

The multiplexing method from the synchronous frames in the IWE1*a* to the asynchronous frames is identical to that of the first embodiment (FIG. 3). A flow is first identified for destination identification. For this purpose, the channel defined by the synchronous network is extracted from the phase information obtained by the AU pointer and TU pointer. After selecting a suitable path from the delivery paths which can reach the destination (opposite IWE) and generating frames, the frames are sent to the asynchronous network.

TU-FR (611) which is a high level path ID performs control which is completely independent of the low level path IDs AU-FR1 (311), AU-FR2 (312). In the relay device XC (2*a*) in the asynchronous network, the logical circuits AU-FR1 (311), AU-FR2 (312), which are set up by low level path identification on the physical circuit between devices, are interconnected, and at this time, reference is not made to TU-FR (611) which is the high level path ID. The flow ID obtained from the AU pointer data and TU pointer data in the synchronous network 1001 is converted to TU-FR (611) by the IWE1*a* in the asynchronous network 1000, and synchronous multiplexing frames are formed again by the opposite interworking device IWE1*b*. In order to perform this frame format reconversion, the IWE1*a*, IWE1*b* are provided beforehand with a means associated with phase information for identifying the channel which uses TU-FR (611) by synchronous network communication.

An end-to-end connection 620 which interconnects the synchronous network communication channel and TU-FR (611) is established by the connection control layer defined by the hierarchized model of FIG. 2.

Figure 7:
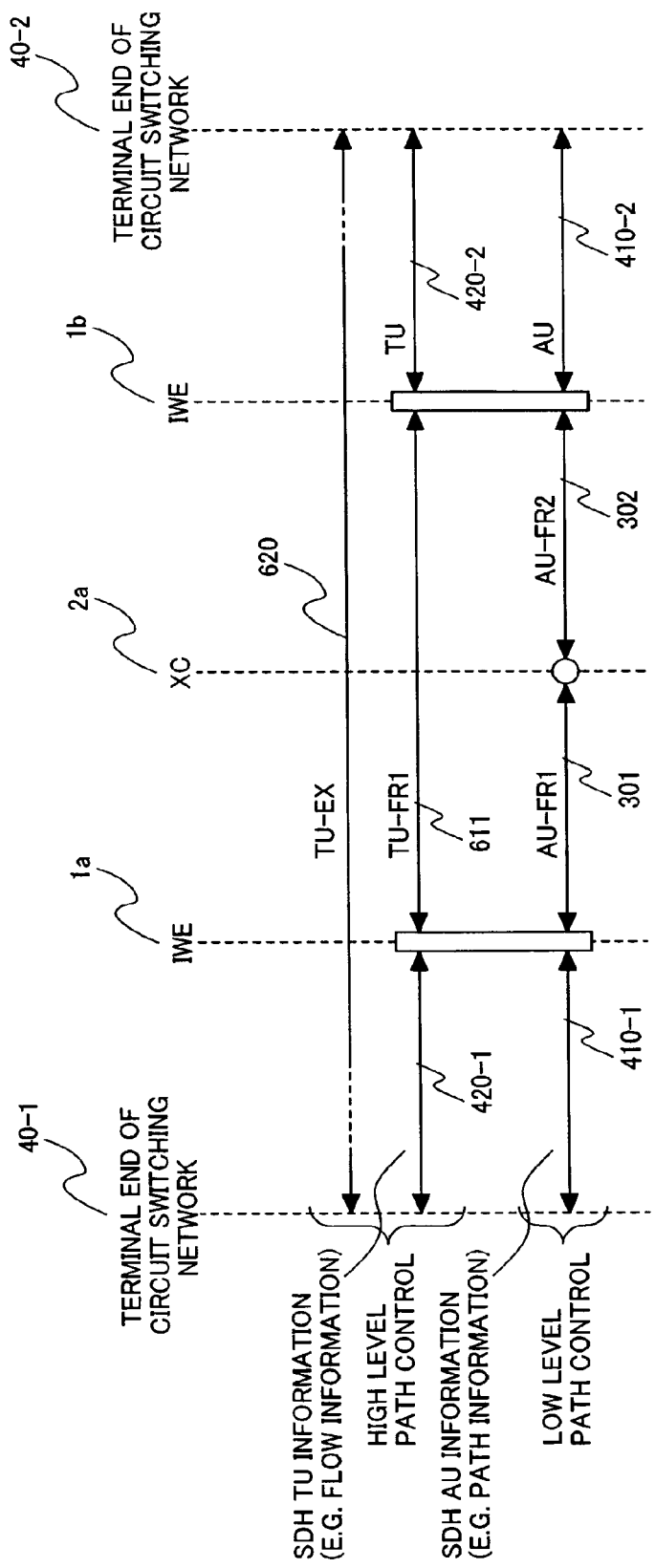
FIG. 7 shows the correlation of logical path control parameters in the second embodiment (FIG. 3).

FIG. 7 shows the correlation of logical path control parameters in the second embodiment (FIG. 3). As shown in FIG. 4, the parameter definition in the logical path control layer is extracted from the hierarchized model of FIG. 2.

Also in this embodiment, AU-FR1 (301) and AU-FR2 (302) are used as low level path ID. A difference from the first embodiment is that, in the logical path cross-connection in the relay device XC2*a* of the asynchronous network 1000, TU-FR (611) which is a high level path ID is not modified. In this embodiment, flow identification which is consistent within the network is performed by TU-FR (611). In this way, the flow destination is determined, and selectable low level logical path candidates are narrowed down. The low level logical path which is actually selected may be statically set as in the first embodiment, or may be set up dynamically whenever a path setup demand occurs. It is assumed that TU-FR (611) is terminated at the IWE1*a*, IWE1*b*.

In a synchronous multi-channel network such as a STM, the communication path and destination are normally set semi-statically by the multiplexing channel by the OpS20. Therefore, the channel (flow) and opposite IWE1*b* can be determined by analyzing the AU pointer and TU pointer which are contained in the synchronous multiplexing frames in the interworking device IWE1*a*. Although the flow identifier is not changed during continuous communication even in the asynchronous network, a decisive difference from the synchronous network is that the multiplexing method is a frame multiplexing system, and there is no need for the destination and intermediate paths to correspond in a fixed way. Therefore, when applying this embodiment, by referring to a flow identifier in the logical path cross-connection of XC, the low level logical path can be selected from the logical path on plural physical circuits according to the network usage status, traffic characteristics during communication and user contract level.

As compared with the first embodiment, in the second embodiment, the interconnection processing of the logical path in XC is simplified by considering that the high level path ID is a flow identifier which is consistent within the network. The logical path in the OpS can be directly managed by this consistency, and compatibility with the synchronous network wherein path control and destination data are closely associated, can be improved.

Figure 8:
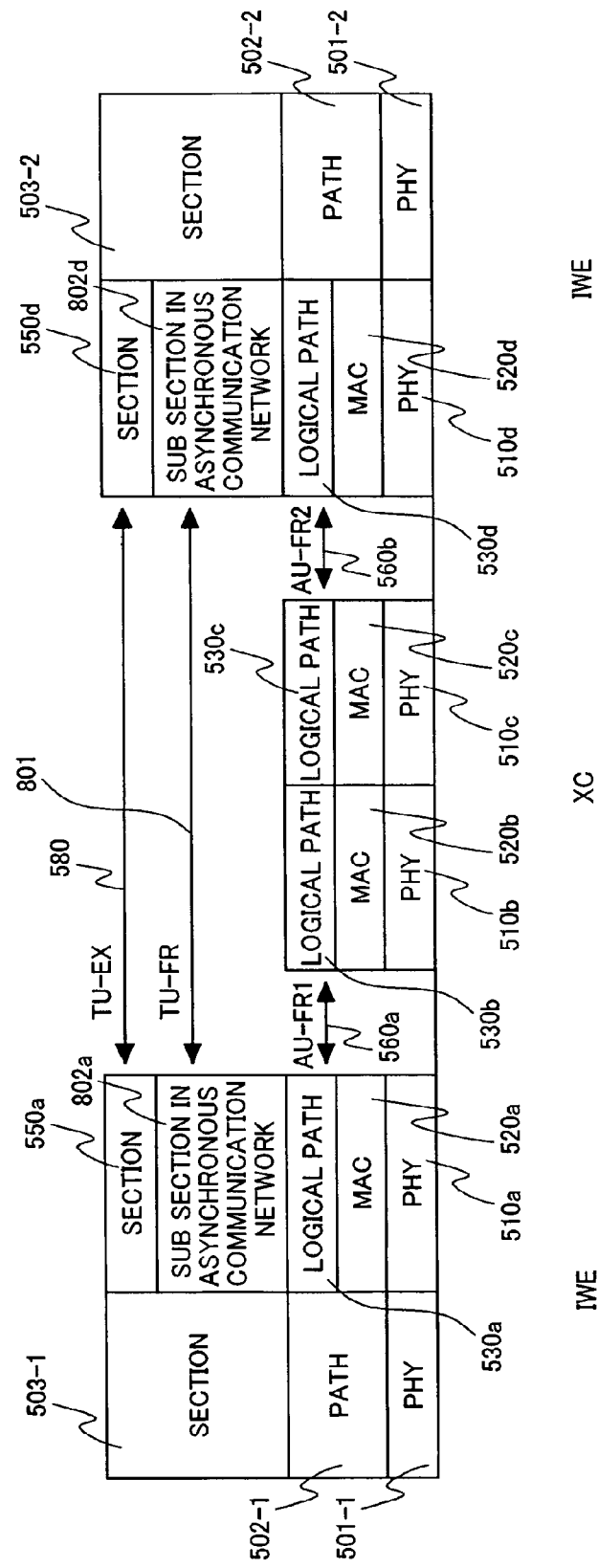
FIG. 8 shows a protocol stack in the second embodiment of this invention.

FIG. 8 shows a protocol stack in the second embodiment of this invention. The management flow layer definition in IWE and XC is almost identical to that of the first embodiment (FIG. 5). A difference from FIG. 5 is that in-network session layers 802a-802d are defined instead of the section session management layers 540a-540d. In FIG. 5, the section session was managed by terminating TU-FR1 and TU-FR2 for each section, and consistent session management was implemented by logical connection thereof to the high level session layer. In FIG. 8, in-network session management is performed by the in-network session layers 802a-802d.

In this way, a tag (label) for TU-FR identification is communalized within the network, and processing can be simplified by omitting the cross-reference of the hierarchized path management parameter in XC. TU-EX is a session management flow which is consistent between all communication sections spanning the synchronous networks and asynchronous network as in FIG. 5. The logical connection to TU-EX of TU-FR is performed only by IWE.

In implementing this invention, some patterns are applicable to an asynchronous network frame format. These patterns may be suitably combined by the TDM data multiplexing degree on the same packet, and the logical path ID setting number on the same circuit. Hereafter, the frame construction used for asynchronous communication will be described using FIG. 8 to FIG. 11.

Figure 9:
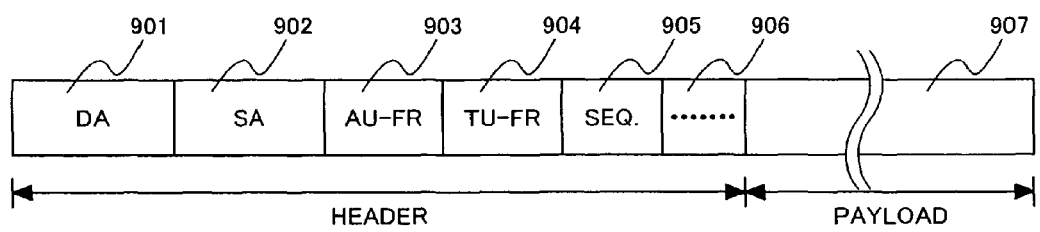
FIG. 9 shows the basic frame configuration used for asynchronous network communication in a relay network when an interworking is applied (Format 1).

FIG. 9 shows the basic construction of a frame used for asynchronous network communication when interworking is applied. The frame comprises a header part and a payload part, and the TDM data transmitted by the synchronous multiplexing frame is carried on the payload part. The header part includes a destination address 901, transmitting origin address 902, low level logical path ID AU-FR (903), high level logical path ID TU-FR (904) and sequence number Seq (905). In order to manage changes in the arrival order of the data by frame conversion, or when a data series is distributed over plural frames and transmitted, a sequence number is used in order to collect data when synchronous multiplexing frames are reconstructed. The construction is also such that additional data 906 can be inserted.

In the frames, one frame is used per communication channel of the synchronous network. For example, in STM multiplexing frames, header assignment (capsuling) is performed in VC-11 units, and one frame is built. The various data differ as regards arrival time, respectively. Specifically, since the TU pointers differ for each VC-11, the data sampling timing and the arrival timing of the VC-11 in the IWE1a are not usually the same. Hence, even if the flow identifier is the same in one frame, the situation where plural VC-11 are carried may arise. In order to deal with this, a pointer which indicates the second VC-11 starting position in a frame is inserted in this frame header information. This pointer field is disclosed also in Japanese Provisional Patent Application No. 2005-244470. In this publication, there is no mention of hierarchy of logical path, but this invention differs in that the header part contains two logical path control parameters.

Figure 10:
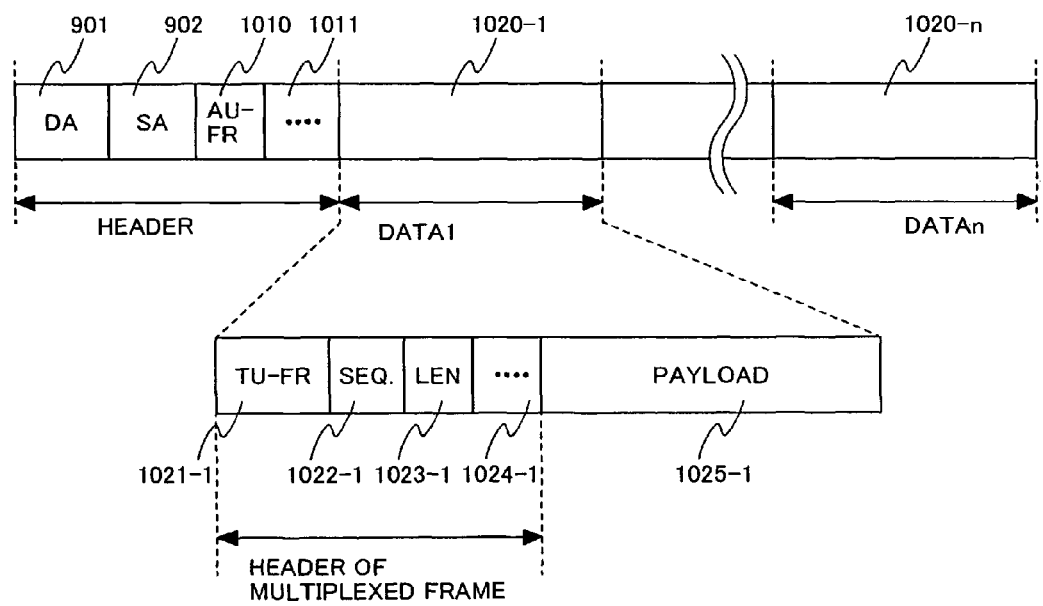
FIG. 10 is a frame configuration when plural data for which the low level logical path is the same, are multiplexed (Format 2).
Figure 11:
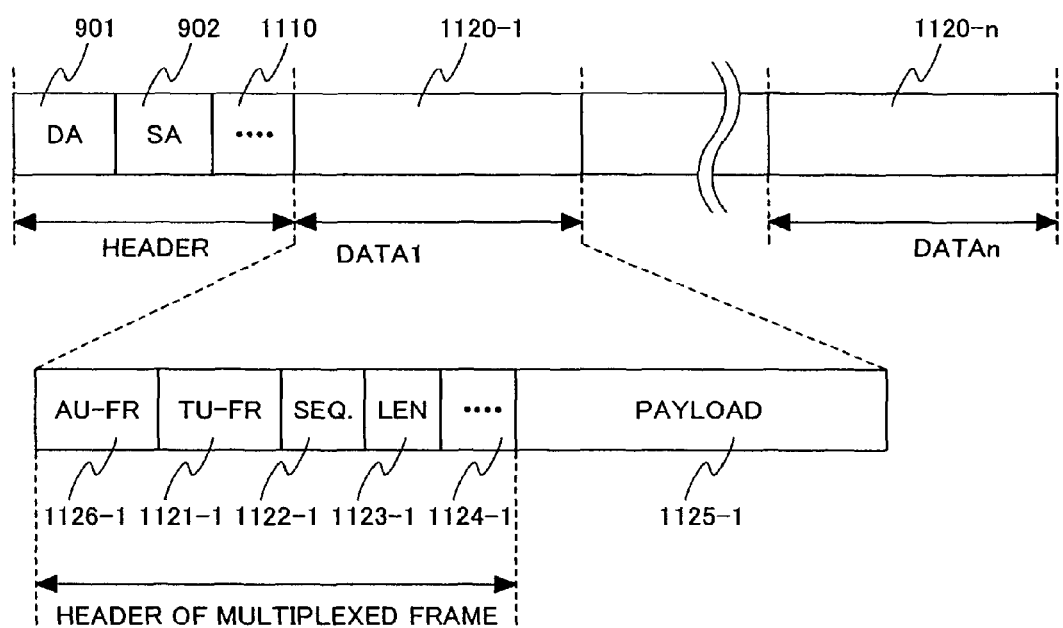
FIG. 11 shows a flow multiplexing format for one frame when plural flows are implemented on the same physical circuit, and the logical path ID which are respectively assigned (low level logical path ID; AU-FR), are different (Format 3).

Also in FIG. 10 and FIG. 11, when plural VC-11 are stored in the payload part, a pointer is inserted in a multiplexing header part provided for each payload as in the case of the basic frame.

FIG. 10 shows frame construction when a low level logical path multiplexes identical plural data on one frame. The common header of the whole frame contains DA901, SA902, the logical path ID AU-FR (1010) and the additional data 1011. Although data equivalent to the VC-11 are carried on the payload part of the frame, the difference here from the case of FIG. 9 is that plural flows are carried on one frame simultaneously.

The header of the multiplexed frame assigned to each flow contains a logical path ID TU-FR (1021), sequence number 1022, data length 1023 and other additional data 1024. The purpose of using the sequence number 1022, as in the case of FIG. 9, is to provide a reference using the opposite IWE1b when data for each flow is collected. The data length shows the length of the multiplexed flow data. Due to this, the starting position for each flow within the frame payload can be specified, which is useful for setup of multiplexing, and de-multiplexing.

Plural loading of the VC-11 by the sampling timing is generated independently for each multiplexing frame. Therefore, the identification pointer of the VC-11 sampled from the middle of the payload is inserted in the header for each multiplexing frame.

FIG. 11 shows the flow multiplexing format to one frame when plural flows are carried on the same physical circuit, but the respectively assigned logical path ID (low level logical path ID; AU-FR) are different. The frame header part contains the DA901, SA902 and the additional data 1110. The multiplexed loading of plural flows on the payload part of the frame is identical to the case of FIG. 10. In this case, the header of the multiplexing frame contains two types of logical path ID. The multiplexing frame comprises a multiplexing header and a payload 1125, and the multiplexing header contains a logical path ID AU-FR (1126), high level logical path ID TU-FR (1121), sequence number 1122, multiplexing frame length 1123 and additional data 1124. The roles of the sequence number and multiplexing frame length field are identical to those of the description of FIG. 10.

Also in this case, depending on the timing when the VC-11 is loaded on the multiplexing payload, the case may arise where sampling is performed from the middle of the VC-11 unit, and the next VC-11 unit is sampled in the middle of a frame. As in FIG. 10, a pointer which indicates the latter VC-11 starting position is inserted in the header of the multiplexing frame.

Figure 12:
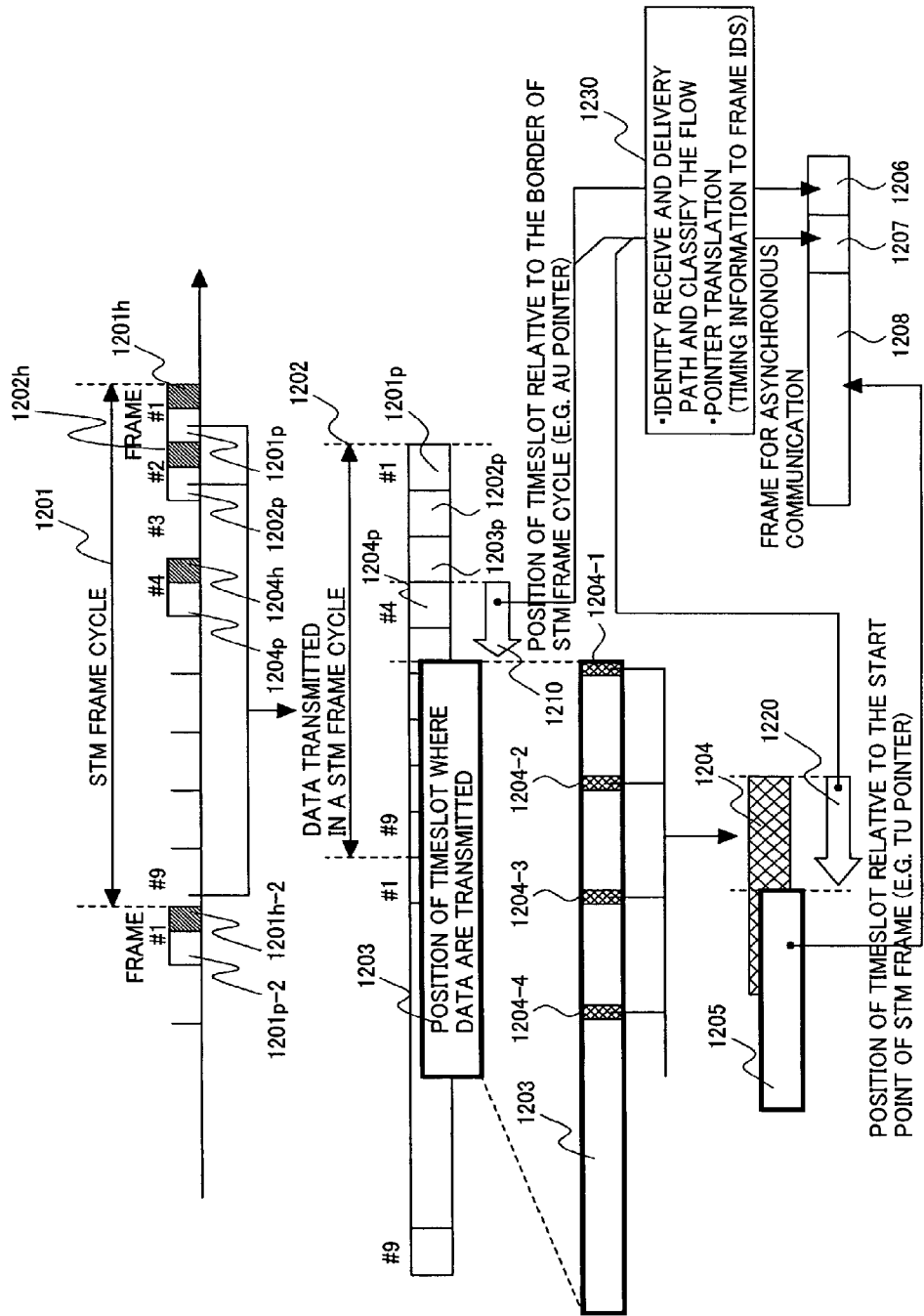
FIG. 12 is a diagram showing the frame processing when a logical multiplexing frame is generated from a synchronous multiplexing frame.

FIG. 12 is a flow chart showing the frame processing when a logical multiplexing frame is generated from a synchronous multiplexing frame.

If synchronous multiplexing frames are aligned with the transmission timing, a frame header 1201h, frame payload 1201p and beyond can be rewritten in one row. As shown in FIG. 12, the device which receives the synchronous multiplexing frames, receives them in time order from the frame header 1201h. STM synchronous multiplexing frames are transmitted nine frames at a time in each frame cycle 1201, and this is a large unit of this STM frame definition.

In the IWE1a, when an STM frame is received, to permit path control within the asynchronous network, the multiplexed frames are analyzed, and disassembled to the VC-11 unit level which is a cross-connection unit. The procedure at this time is described below.

The payload part is extracted and collected from the data received in the format of the frames 1201h and 1201p for every fixed cycle. This payload 1202, as shown in FIG. 12, removes the headers from the received frames and arranges them in order of reception from a payload 1201p of the received frame 1.

In STM frames, a gap is produced between the start timing of the payload 1202 received in the STM frame cycle, and the timing which can actually identify the transmitting data 1203 on the payload. In order to notify this gap and to extract arbitrary data from the multiplexing frame, a parameter known as an AU pointer 1210 is contained in the header of the STM frame. The AU pointer 1210 is stored in a header 1204h of the fourth frame transmitted in the STM frame cycle, and shows the delay from the end time of the header 1204h to the multiplexing data transmitting start time. The delay data for the AU pointer 1210 can be used as a parameter which identifies an input circuit for the device which receives the synchronous multiplexing frames. Matching with the circuit ID can be usefully implemented by recording the identifier of the input circuit and the AU pointer 1210 together.

Next, data is disassembled from the multiplexed data into circuit switching units. The multiplexing frame 1203 is in a form where data flows overlap alternately at a fixed interval. Focusing attention on each flow, the data is arranged in data fragments 1204-1, 1204-2, and when these are collected, the data 1204 is obtained. Here too, as in the case of the AU pointer, the start time of the collected data 1204 differs from the timing of the boundary at which data can be identified for each unit. Here, intensive data can be extracted by a parameter known as a TU pointer 1220. The TU pointer 1220 is stored in the leading position of the data fragments 1204-1, 1204-2 distributed by the multiplexed data 1203, and after collection, the pointer comes in the leading position.

The TU pointer shows the multiplexing position (channel) on the circuit corresponding to the AU pointer 1210. Since it is a synchronous multiplexing system, a flow with a different timing may be viewed as another flow, so the TU pointer itself may be considered as a data flow identifier.

In order to generate a logical multiplexing frame, it is required to match the hierarchized logical path ID, AU and TU pointer. The path ID can be distinguished by the input path identifier or the path identifier and AU pointer, and the data transmitting channel (flow) can be distinguished by the AU pointer 1210 and TU pointer 1220. From these parameter changes, the IDs of the logical path layer 1207 (corresponding to the low level path ID) and the session layer 1208 (corresponding to the high level path ID) are determined, and small frames which are the minimum multiplexing unit in an asynchronous network communication packet, are generated.

Figure 13:
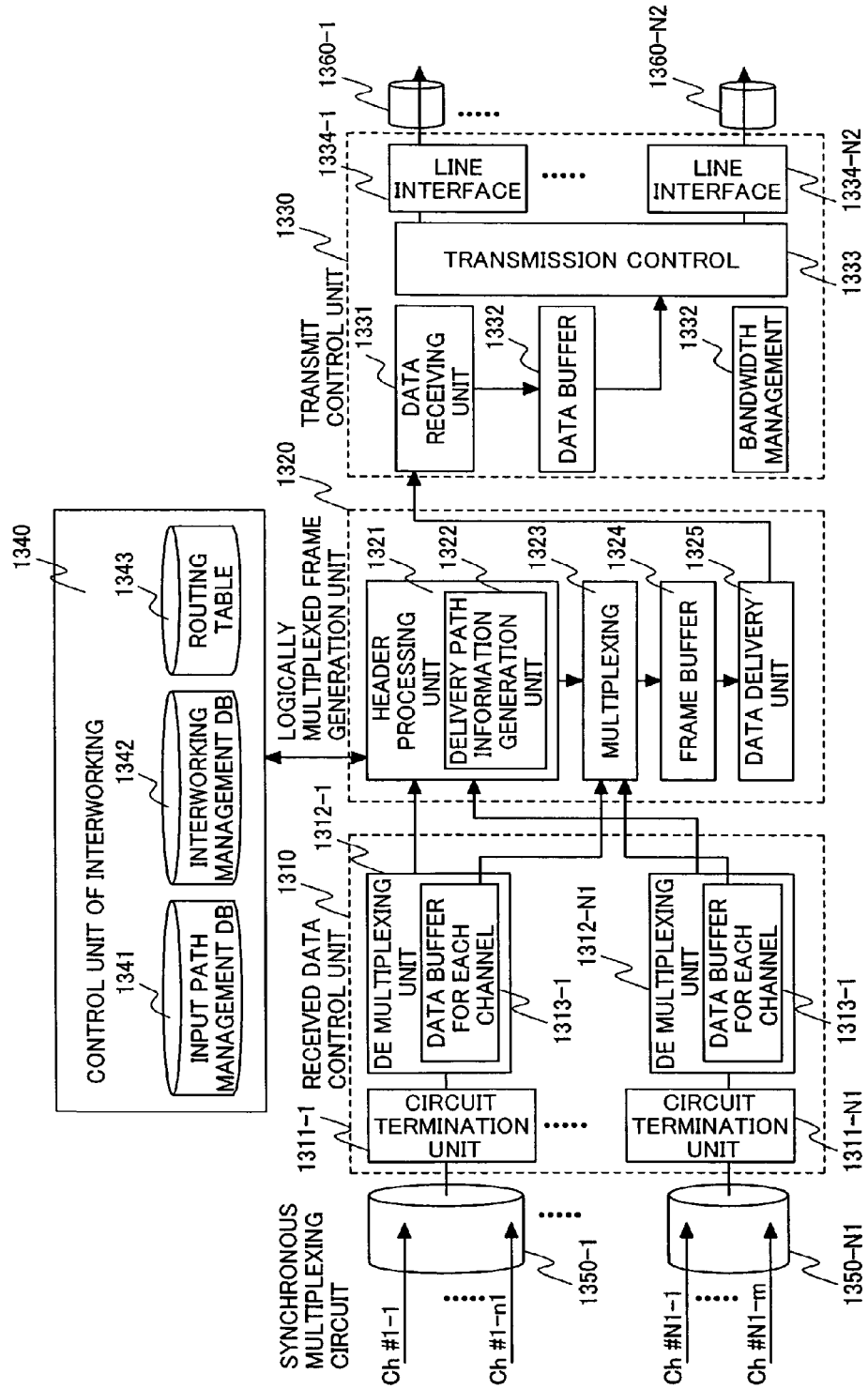
FIG. 13 shows the construction of the interworking device (IWE) for realizing communication method conversion and mutual notification of channel management information according to this invention.

FIG. 13 shows the construction of the interworking device (IWE) for implementing the communication method conversion and mutual notification of channel management information of the present invention. IWE comprises a receive data control unit 1310 having one or more synchronous multiplexing line interface units 1311-1-1311-N1, a transmit control unit 1330 having one or more packet transmission line interface units 1334-1-1334-N2, a logical multiplexing packet generation unit 1320, and an interworking 1340 which controls the interconnection processing between the synchronous multi-channel networks and packet communication networks.

The receive data control unit 1310 comprises demultiplexing units 1312-1 1312-N1, which demultiplex input synchronous multiplexing frames for every line switching unit, and buffers 1313-1 1313-N1 for each channel which are contained in the demultiplexing units and hold demultiplexed data for each line switching unit. The receive data control unit 1310 extracts communication control information containing data and path management information from the input synchronous multiplexing frames, and notifies the extracted communication control information to the logical multiplexing frame generation unit 1320.

The logical multiplexing frame generation unit 1320 acquires data in control data which has been converted for packet communication networks by communication with the control unit of the interworking 1340 based on the received communication control data. Likewise, transmission destination data of the relevant frames is acquired from the control unit of the interworking 1340. Based on the acquired transmission destination data, transmission destination data is assigned per line switching unit and small frames are generated corresponding to the received data. The generated small frames are forwarded to the transmit control unit 1330.

The transmit control unit 1330 temporarily stores the small frames received from the frame generation unit 1320 in a receive buffer 1332. In the meantime, a physical circuit or logical circuit of this frame is determined, and the aforesaid small frames are forwarded to the relevant transmission destination circuit.

The interworking device has an interworking control unit 1340 which comprises an input circuit table 1341 for determining the transmission destination and passage path for input synchronous multiplexing frames from the communication control information contained in the input synchronous multiplexing frames, an IW management table 1342 for matching the communication control information of the input synchronous multiplexing circuit with the communication control information for packet communication networks (i.e., hierarchized logical path ID), and a path channel table 1343 which holds path information relating to that device which is the basis of the aforesaid hierarchized logical path control.

FIG. 14 shows an example of an input management table configuration. This table contains one or more parameters selected from among the AU pointer value in the STM network, TU pointer value, channel ID obtained therefrom, transmission destination device address or identifier, and input circuit ID.

FIG. 15 shows an example of an IW (Interworking) management table configuration. This table contains one or more parameters selected from among a channel ID, flow ID, transmission destination device address or identifier, and logical path ID toward the destination or the next hop.

Figure 16:
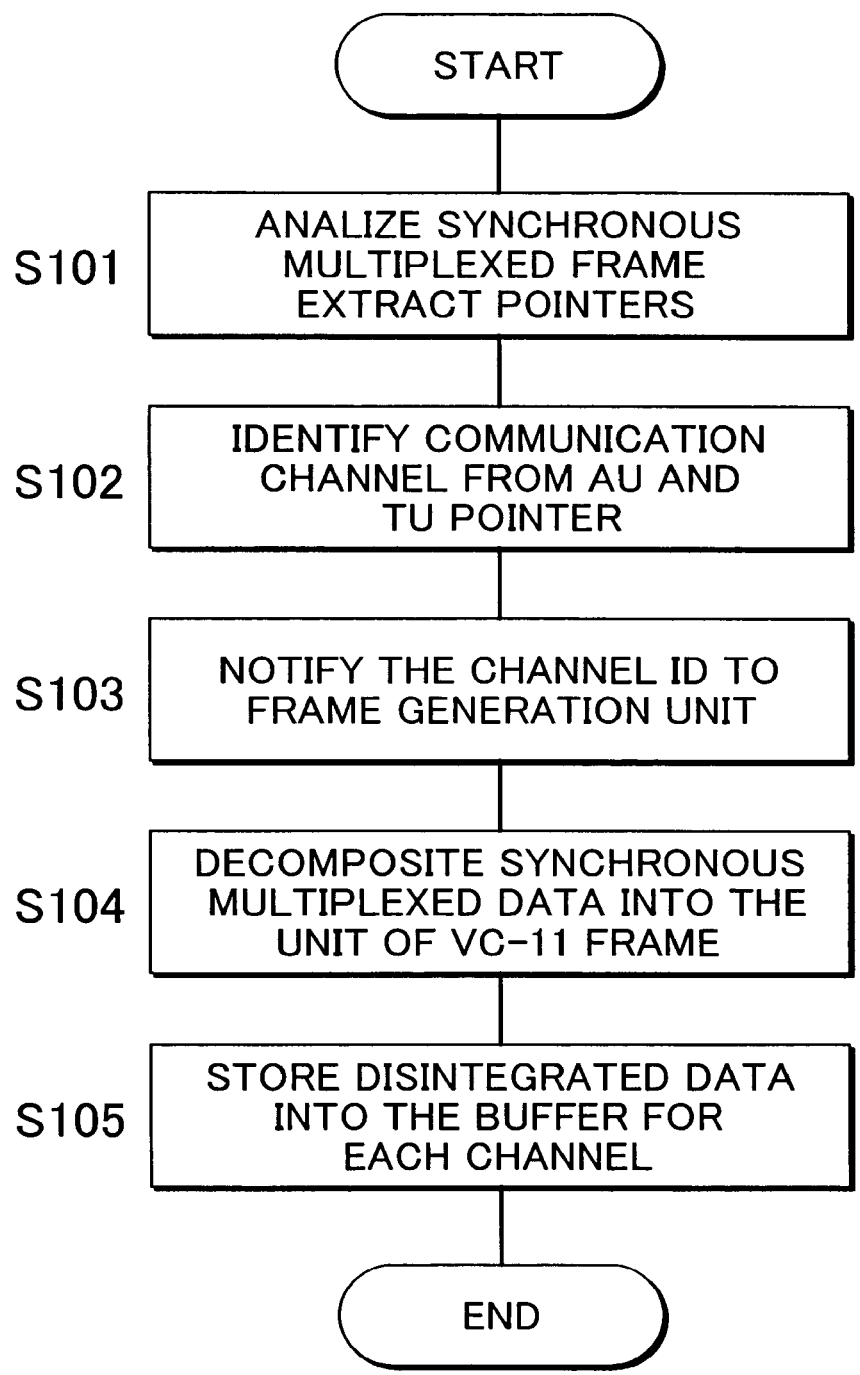
FIG. 16 is a flow chart describing the processing procedure in a received data control unit of FIG. 13.

FIG. 16 is a flow chart describing the processing procedure in the received data control unit of FIG. 13. Processing is started whenever a synchronous multiplexing frame is received. First, the SOH and POH of the synchronous multiplexing frames which were received in Step S101 are analyzed, and the AU pointer and TU pointer are extracted. Next, in a Step S102, synchronous network channel extraction is performed using the extracted AU and TU pointer. Here, when a change of the pointer value is notified by a new data flag of the AU or TU pointer, there is a change-over to a flow other than the flow which was so far received. In order to identify this, in addition to the channel ID, each data is identified using a flow ID. In a Step S103, the extracted channel information and flow identification data are notified to the frame generation unit 1320. In the frame generation unit, based on the data received here, a hierarchized logical path is set up in the packet communication network. In a Step S104, the synchronous multiplexed data is demultiplexed according to the synchronous network channel extracted in the Step S102 or the flow ID. Here, the demultiplexing candidates are small frames corresponding to the VC-11 units which are cross-connection units in the synchronous network. In a step S105, the small data frames which were demultiplexed are stored according to channel or flow in a buffer. The reason for storing the data here is to wait for processing of the control data notified to the frame generation unit in the Step S103. As soon as assignment of a hierarchized logical path is completed, a small frame is called, and the minimum unit frame which constitutes the logical multiplexing frame within the packet communication network, is generated.

Figure 17:
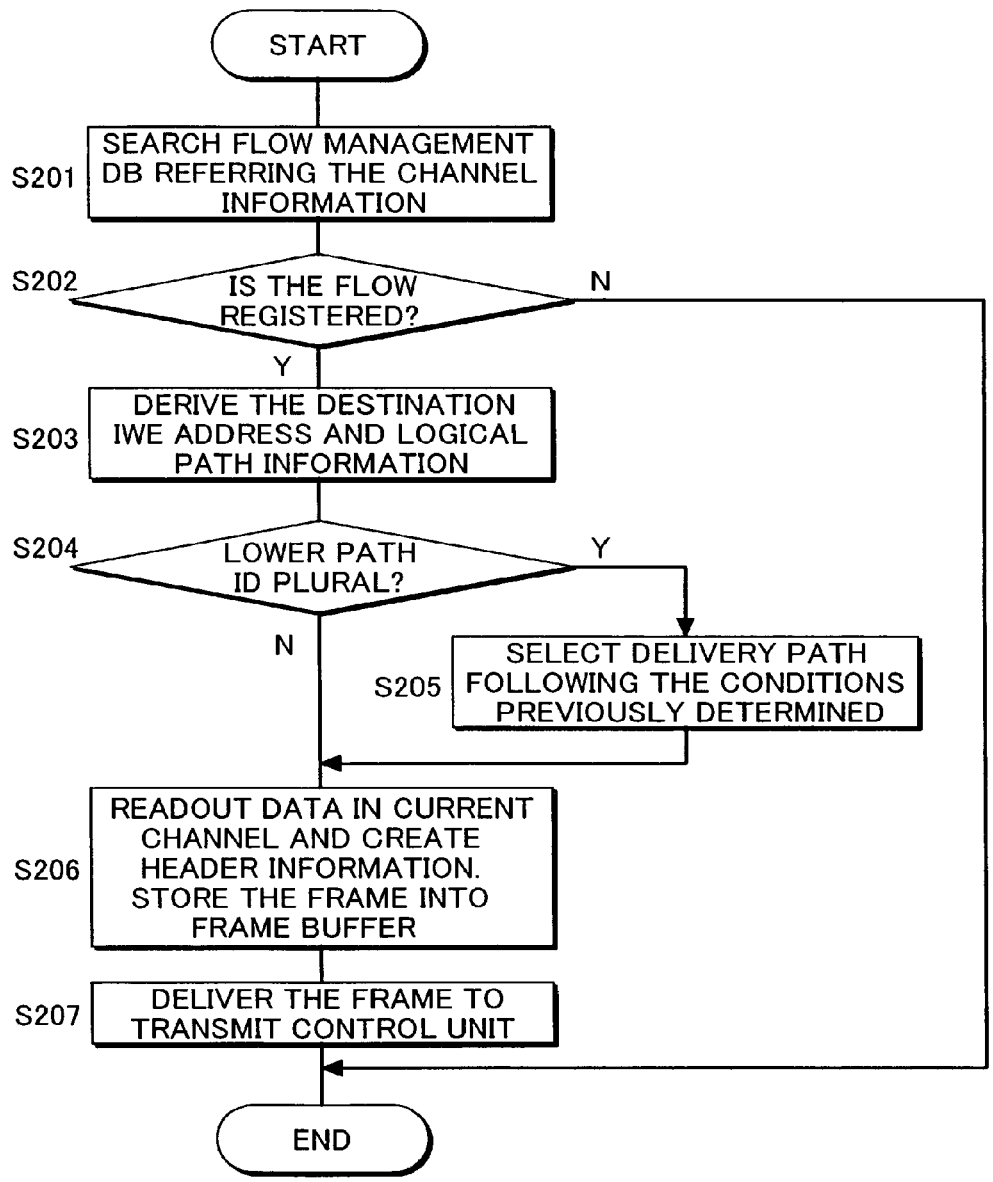
FIG. 17 is a flow chart describing the processing procedure in a logical multiplexing frame generation unit 1320 of FIG. 13.

FIG. 17 is a flow chart describing the processing procedure in the logical multiplexing frame generation unit 1320 of FIG. 13. When the communication control information in the synchronous network is received from the received data control unit 1310, based on the data received in the Step S201, the flow management table in the control unit of the interworking 1340 is searched. The search key used here is the channel information or the flow ID extracted by a demultiplexing block 1312. The channel (flow) is connected with a destination and data in an intermediate path in the synchronous network, and when forwarding the data to the packet communication network, it is a key which determines assignment of the hierarchized logical path ID. In a Step S202, it is determined whether or not the receiving channel ID is registered as a channel which can use a path within the packet communication network. If it is not a channel which should be forwarded to the packet communication network, transmission is interrupted and processing is terminated. When it can be forwarded, in a Step S203, a destination device ID within the packet communication network and a hierarchized logical path ID within the packet communication network are acquired by referring to the database of the control unit of the interworking 1340. Here, as a characteristic of the asynchronous network, a case may arise where plural paths can be selected for the same destination. In this case, a priority is set beforehand for candidate paths, or the path used for transmission of the flow concerned is selected by changing the priority dynamically according to bandwidth usage status. In the stage (Step S206) where channel information is determined, the channel-specific data stored in the frame buffer 1313 is extracted, the header of the multiplexed frame containing the hierarchized logical path ID and sequence number is assigned, and stored in the frame buffer in the frame generation unit 1320. Next, in a Step S207, the frame is forwarded to the relevant transmit control unit 1330 by referring to the transmission destination of the frame in the buffer. Here, there may be plural transmit control units, and each transmit control unit can be further provided with plural line interface units (as in the interface card construction of an ordinary router/switch).

Figure 18:
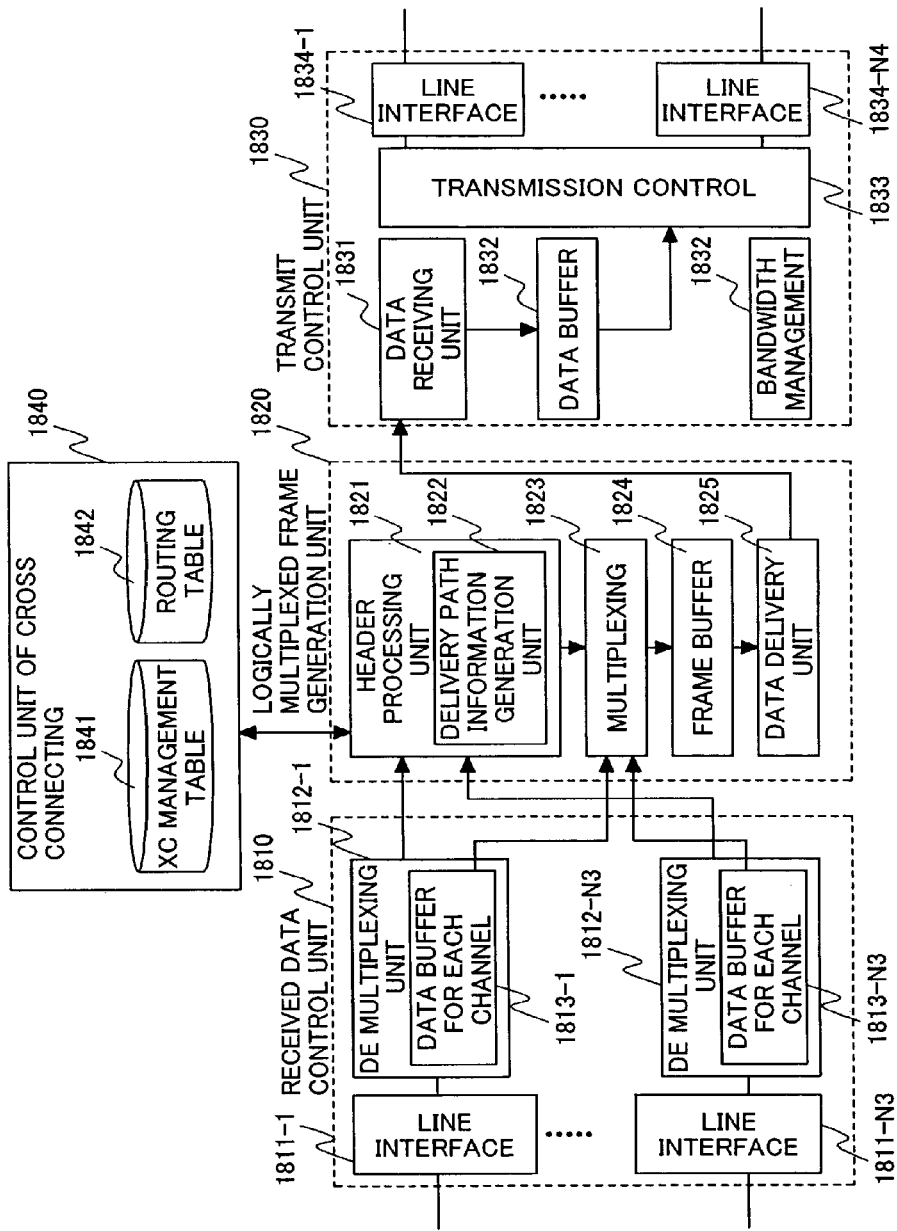
FIG. 18 is a block diagram showing the functional configuration of a cross-connection device (XC).

FIG. 18 shows the functional block of the cross-connection device (XC) which performs interconnection of logical paths in order to forward the frame data within the asynchronous network.

The cross-connection device comprises a received data control unit, a logical multiplexing frame generation unit, a cross-connecting control unit and a transmit control unit.

The received data control unit has the function of terminating the frames inputted via the logical path, and when plural data flows are multiplexed on one frame, of demultiplexing this data and saving each flow data in a data buffer. The line interface unit extracts frames by synchronizing the incoming signals. Here, termination is performed as a physical layer. In the demultiplexing unit, the multiplexed individual flows are identified from the frame structure, and logical termination is performed.

The logical multiplexing frame generation unit determines the transmission destination for each flow based on the identifier (multiplexing header information in FIG. 9-FIG. 11) for each flow notified from the demultiplexing block of the received data control unit. The parameters which should be determined are combinations of high level and low level logical path IDs used in the transmission destination section. In order to acquire these logical path IDs, the frame generation unit refers to the XC management table in the cross-connecting control unit. After acquiring a transmission destination for each flow, the header of the multiplexing frame is reconstructed and the multiplexing frame is generated. When applying the frame multiplexing construction shown in FIG. 10 or 11, flow multiplexing frames which are multiplexing candidates are collected, and an asynchronous network communication frame is constructed. The constructed frame is temporarily kept in a frame buffer. The frame header may be reconstructed in this buffer. After frame reconstruction, the frame is forwarded to the transmit control unit for frame transmission.

The transmit control unit refers to the frame header, and transmits the frame via respectively supported logical paths. The frame forwarded from the frame generation unit is temporarily stored in the frame receive buffer via a frame receive unit. The transmit control unit determines the transmission destination from the header information of the stored frame, and transmits the frame to a suitable logical or suitable physical circuit via the line interface unit.

A cross-connecting control unit contains a XC management table holding the logical path interconnection data, and path tables holding the network topology around the device (XC). The path tables are, for example, tables in which the devices adjacent to this device (XC) and surrounding path information, such as the MAC address table in the data link layer of the OSI model and IP routing table in the network layer, are recorded. This table may be statically set up by the OpS, or path information can be automatically configured such as by STP (Spanning Tree Protocol), OSPF (Open Shortest Path First) and RIP (Routing Information Protocol). The XC management table is set up based on this path table. The table which sets the logical paths used in each circuit based on the network topology obtained from the path table, is the XC management table. If a path cannot be used due to a fault or maintenance, the logical path ID set for that path is deleted from the entries in the XC management table (or an invalid flag is set), so that incorrect information is not notified to the frame generation unit. The collaboration between these tables is performed by the cross-connecting control unit.

FIG. 19 shows the construction of the XC management table kept by XC. This table comprises a data flow identifier 1901, receive channel information 1902 used for data flow identification and forwarding destination determination, logical path ID AU-FR (1903) which received the frame, high level logical path ID TU-FR (1904) contained in the input frame (for each input flow), logical path ID AU-FR (1905) showing the output destination of this frame, high level logical path ID for identifying the flow by the output destination logical circuit, and other additional data 1907.

In XC, when a frame is received, the data flow carried on this frame by the logical path ID contained in the frame, is identified. For the first and second embodiments, the methods of applying the logical path ID respectively differ, but either method may be used. When applying the first embodiment, channel identification is performed using both TU-FR and AU-FR as the logical path ID of the input frame. If the data flow generating timing differs even for the same channel, this is regarded as a different flow and the flow ID will be different. Flow identification is usually performed by IWE, and when the flow changes within this channel, the high level logical path ID assigned to the flow concerned will also change over in synchronism. When performing flow identification individually for every XC, XC must be able to receive "new data flag" data from AU or TU frame data on the synchronous multiplexing frame. This is equivalent to performing flow identification by IWE to include this data in the hierarchy management ID. As described above, what is required for frame forwarding is the correspondence relation between the input logical path and output logical path. In the second embodiment, flow identification can be performed by TU-FR1904 alone. According to the routing table, the data transmission destination is known from TU-FR1904, so only TU-FR1904 and the output logical paths 1905, 1906 are required for frame forwarding.

In this table, when a new flow arrives, an entry is generated by referring to the routing table. When the flow in progress is completed, the entry is eliminated in order to open a transmitting band.

Figure 20:
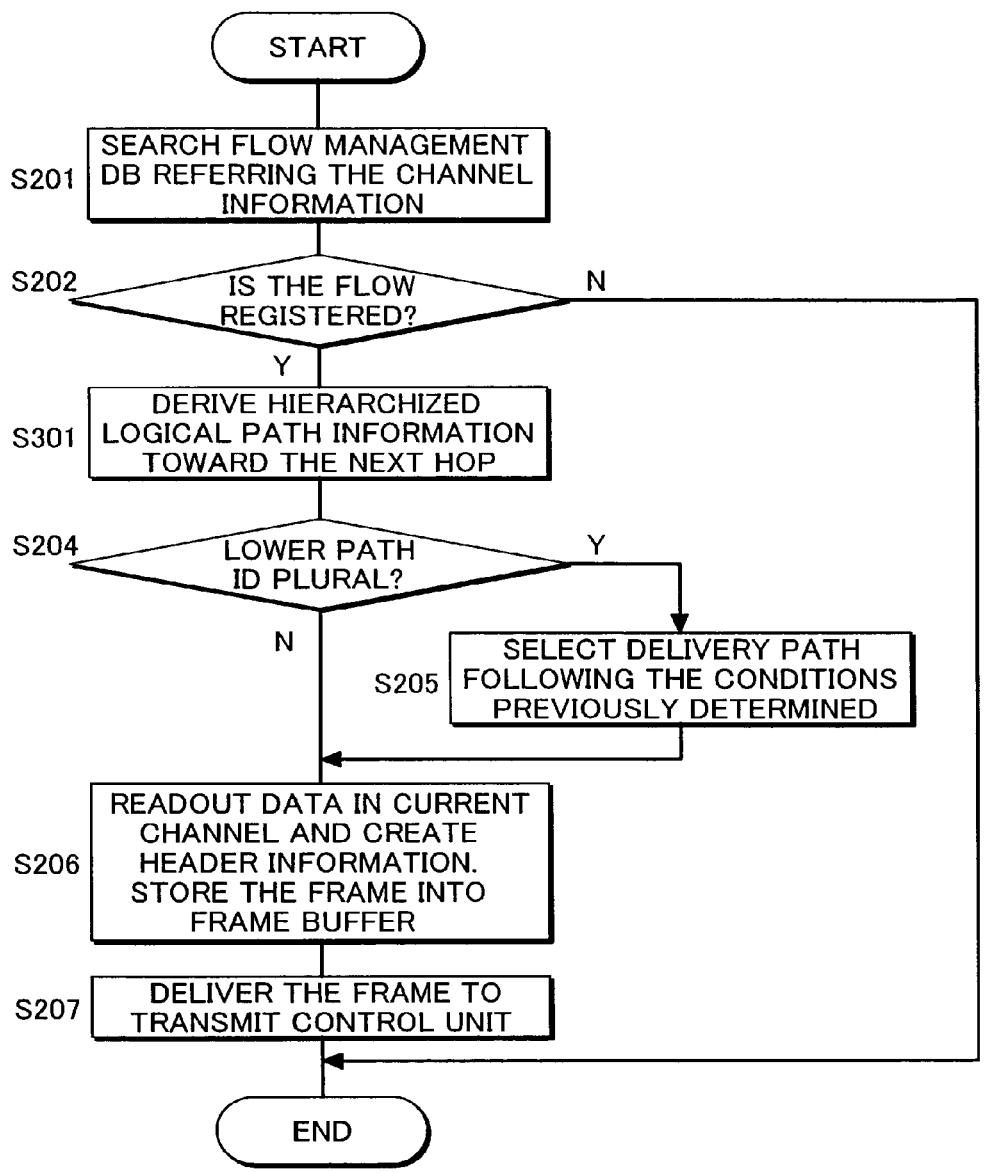
FIG. 20 is a flow chart in asynchronous frame forwarding processing which shows the correlation of functional blocks in XC.

FIG. 20 is a flow chart showing the processing procedure in the logical multiplexing frame generation unit of XC. A difference from IWE1*a* is that since XC is not a terminal device of the packet communication network, it cannot be a communication end point. Hence, except for the step S301 related to cross-connection processing, the processing in IWE is fundamentally identical to that shown in FIG. 17.

In the cross-connecting control unit, the logical relation between a data flow identifier which is a high level ID of the hierarchized logical path ID and communication path information which is a low level ID is managed, and in order to forward data packets, it is sufficient to acquire the commutation relation between these sets of hierarchized logical path ID. However, since this commutation relation is implemented per data flow, when plural data flows are multiplexed by the packet format as shown in FIG. 10 or 11, processing which demultiplexes the data for each data flow, and after acquiring hierarchized logical path ID, reconstructs data packets by multiplexing data as necessary by communication path information, is required. Data packet reconstruction (re-multiplexing) is controlled by a multiplexing block 1823 of FIG. 18, and the generated packets are stored in a frame buffer.

In connection-less packet communication networks, communication quality can be improved while retaining easy network construction which is a characteristic of packet communication networks, by introducing hierarchized logical path management functions. Although a path setup and communication management function were not provided in the prior art, according to this invention, a maintenance management function can be implemented in packet communication networks which enhances the convenience of network management, and expands the service area supported by the packet network. Specifically, packet communication networks which were used as data networks such as broadband ether, can now accommodate services which use voice communication and dedicated lines, thus mitigating the burden on companies which manage several networks having different communication modalities.

By introducing the concept of hierarchized path management, compatibility is obtained with the communication control function of synchronous networks which have been widely used in the past. The range of options of physical layer infrastructure is thereby expanded. This promotes the practical use of existing infrastructure, and permits flexible correspondence in the transition period to next generation networks based mainly on packet communication.

In particular, in management of carriers or company networks, even after the transition to packet communication networks, reliability can be maintained by the ability to provide a network quality management equivalent to that of the synchronous networks used conventionally. Further, since the control data for hierarchized management can be converted for both synchronous networks and packet networks, there is no change in operating system, and a shift to next generation networks is therefore possible.

What is claimed is:

1. A network device coupled to a first network that performs communication using a synchronous multiplexing frame and a second network that performs communication using a data packet or a data frame, the network device comprising:
a receiving control unit comprising:
a synchronous multiplexing line interface unit that terminates the synchronous multiplexing frame, and
a demultiplexing unit that demultiplexes the received synchronous multiplexing frame into a frame for each channel and holds the frames,
an interwork control unit that stores an interworking device (IWE) management table holding correspondence information of channel information of a channel and a hierarchized logical path identifier that identifies communication control information of the second network,
a logical multiplex frame generating unit that:
searches the IWE table by using a key of the channel information,
obtains a destination device identifier within the second network and the hierarchized logical path identifier corresponding to the channel information,
extracts the frame from the demultiplexing unit, and
adds header information including the hierarchized logical path identifier corresponding to the channel information to the extracted frame, and
a sending control unit that transmits the generated frame to the second network,
wherein the receiving control unit extracts the channel information based on information of the synchronous multiplexing frame, and wherein the receiving control unit:
extracts phase information from the synchronous multiplexing frame, and
extracts the channel information of the synchronous multiplexing frame based on the phase information.

2. The network device according to claim 1, wherein the phase information comprises an AU pointer and a TU pointer.

3. The network device according to claim 1,
wherein the hierarchized logical path identifier comprises a upper path identifier and a lower path identifier,
wherein the upper path identifier is used for extracting each flow from a plurality of flows, and
wherein the lower path identifier specifies a communication path between adjacent devices.

* * * * *